US011128861B2

(12) United States Patent
Ko et al.

(10) Patent No.: US 11,128,861 B2
(45) Date of Patent: Sep. 21, 2021

(54) INTRA PREDICTION METHOD AND DEVICE

(71) Applicant: Electronics and Telecommunications Research Institute, Daejeon (KR)

(72) Inventors: Hyun Suk Ko, Daejeon (KR); Jin Ho Lee, Daejeon (KR); Sung Chang Lim, Daejeon (KR); Jung Won Kang, Daejeon (KR); Ha Hyun Lee, Seoul (KR); Dong San Jun, Daejeon (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/099,639

(22) PCT Filed: Jun. 15, 2017

(86) PCT No.: PCT/KR2017/006241
§ 371 (c)(1),
(2) Date: Nov. 7, 2018

(87) PCT Pub. No.: WO2017/222237
PCT Pub. Date: Dec. 28, 2017

(65) Prior Publication Data
US 2019/0191155 A1    Jun. 20, 2019

(30) Foreign Application Priority Data

Jun. 22, 2016  (KR) .................. 10-2016-0078272
Aug. 4, 2016   (KR) .................. 10-2016-0099618

(51) Int. Cl.
*H04N 19/11* (2014.01)
*H04N 19/96* (2014.01)
(Continued)

(52) U.S. Cl.
CPC .......... *H04N 19/11* (2014.11); *H04N 19/105* (2014.11); *H04N 19/159* (2014.11);
(Continued)

(58) Field of Classification Search
CPC .... H04N 19/11; H04N 19/176; H04N 19/184; H04N 19/96; H04N 19/105;
(Continued)

(56) References Cited

U.S. PATENT DOCUMENTS

2011/0249739 A1    10/2011  Liu et al.
2013/0016783 A1*    1/2013  Kim ................. H04N 19/119
                                                       375/240.13
(Continued)

FOREIGN PATENT DOCUMENTS

KR    10-2009-0046815 A    5/2009
KR    10-2010-0130344 A    12/2010
(Continued)

OTHER PUBLICATIONS

International Search Report dated Sep. 14, 2017 in counterpart International Patent Application No. PCT/KR2017/006241 (4 pages, in Korean with English translation).

*Primary Examiner* — Sath V Perungavoor
*Assistant Examiner* — Tyler B Edwards
(74) *Attorney, Agent, or Firm* — NSIP Law

(57) ABSTRACT

The present invention relates to an intra prediction method and apparatus. The image decoding method according to the present invention may comprise decoding information on intra prediction; and generating a prediction block by performing intra prediction for a current block based on the information on intra prediction. The information on intra prediction may include information on an intra prediction mode, and the intra prediction mode may include a curved intra prediction mode.

7 Claims, 34 Drawing Sheets

(51) Int. Cl.
*H04N 19/176* (2014.01)
*H04N 19/184* (2014.01)
*H04N 19/159* (2014.01)
*H04N 19/105* (2014.01)
*H04N 19/593* (2014.01)

(52) U.S. Cl.
CPC ......... *H04N 19/176* (2014.11); *H04N 19/184* (2014.11); *H04N 19/593* (2014.11); *H04N 19/96* (2014.11)

(58) Field of Classification Search
CPC .. H04N 19/107; H04N 19/117; H04N 19/159; H04N 19/593; H04N 19/91
See application file for complete search history.

(56) References Cited

U.S. PATENT DOCUMENTS

| | | | |
|---|---|---|---|
| 2013/0101031 A1* | 4/2013 | Van der Auwera | H04N 19/14 375/240.12 |
| 2013/0251036 A1 | 9/2013 | Lee et al. | |
| 2014/0133559 A1 | 5/2014 | Kim et al. | |

FOREIGN PATENT DOCUMENTS

| | | |
|---|---|---|
| KR | 10-2014-0124447 A | 10/2014 |
| KR | 10-2014-0124448 A | 10/2014 |
| KR | 10-2015-0113524 A | 10/2015 |
| KR | 10-1600059 B1 | 3/2016 |

\* cited by examiner

FIG. 7

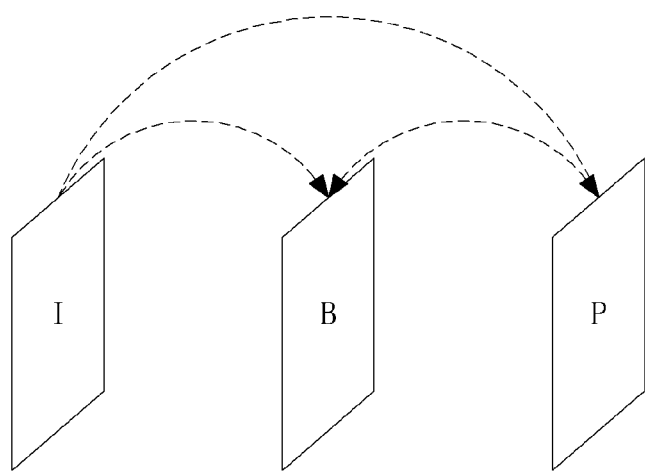

FIG. 8

| Intra Prediction Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertical direction transform set | 2 | 1 | 0 | 1 | 0 | 1 | 0 | 1 | 0 | 1 | 0 | 1 | 0 | 1 | 0 | 0 | 0 | 0 |
| horizontal direction transform set | 2 | 1 | 0 | 1 | 0 | 1 | 0 | 1 | 0 | 1 | 0 | 1 | 0 | 1 | 2 | 2 | 2 | 2 |
| Intra Prediction Mode | 18 | 19 | 20 | 21 | 22 | 23 | 24 | 25 | 26 | 27 | 28 | 29 | 30 | 31 | 32 | 33 | 34 | |
| vertical direction transform set | 0 | 0 | 0 | 0 | 0 | 1 | 0 | 1 | 0 | 1 | 0 | 1 | 0 | 1 | 0 | 1 | 0 | |
| horizontal direction transform set | 2 | 2 | 2 | 2 | 2 | 1 | 0 | 1 | 0 | 1 | 0 | 1 | 0 | 1 | 0 | 1 | 0 | |
| Intra Prediction Mode | 35 | 36 | 37 | 38 | 39 | 40 | 41 | 42 | 43 | 44 | 45 | 46 | 47 | 48 | 49 | 50 | 51 | 52 |
| vertical direction transform set | 1 | 0 | 1 | 0 | 1 | 0 | 1 | 0 | 1 | 0 | 1 | 2 | 2 | 2 | 2 | 2 | 2 | 2 |
| horizontal direction transform set | 1 | 0 | 1 | 0 | 1 | 0 | 1 | 0 | 1 | 0 | 1 | 0 | 0 | 0 | 0 | 0 | 0 | 0 |
| Intra Prediction Mode | 53 | 54 | 55 | 56 | 57 | 58 | 59 | 60 | 61 | 62 | 63 | 64 | 65 | 66 | | | | |
| vertical direction transform set | 2 | 2 | 1 | 0 | 1 | 0 | 1 | 0 | 1 | 0 | 1 | 0 | 1 | 0 | | | | |
| horizontal direction transform set | 0 | 0 | 1 | 0 | 1 | 0 | 1 | 0 | 1 | 0 | 1 | 0 | 1 | 0 | | | | |

Diagonal　　　　　　　Horizontal　　　　　　　Vertical (a)  (b)

| Block Size($N_s$) | 4×4 | 8×8 | 16×16 | 32×32 | 64×64 |
|---|---|---|---|---|---|
| intraHorVerDistThresh | 10 | 7 | 1 | 0 | 10 |

FIG. 20

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| | | | | | | | straight-directional intra prediction mode | | | | | | | | | | |
| intraPredAngle | - | 32 | 26 | 21 | 17 | 13 | 9 | 5 | 2 | 0 | -2 | -5 | -9 | -13 | -17 | -21 | -26 |

| predModeIntra | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| | | | | | | | straight-directional intra prediction mode | | | | | | | | | | |
| intraPredAngle | -32 | -26 | -21 | -17 | -13 | -9 | -5 | -2 | 0 | 2 | 5 | 9 | 13 | 17 | 21 | 26 | 32 | curved intra prediction mode

| predModeIntra | 35 | 36 | 37 | 38 | 39 | 40 | 41 | 42 |
|---|---|---|---|---|---|---|---|---|
| | (upper right → lower left) | (upper left → lower right type-1) | (lower left → upper right) | (upper left → lower right type-2) | (upper → lower left) | (upper → upper left) | (left → upper right) | (left → lower right) |
| Parameters | a plurality of curv parameters and/or cw parameters | a plurality of curv parameters and/or cw parameters | a plurality of curv parameters and/or cw parameters | a plurality of curv parameters and/or cw parameters | a plurality of curv parameters and/or cw parameters | a plurality of curv parameters and/or cw parameters | a plurality of curv parameters and/or cw parameters | a plurality of curv parameters and/or cw parameters |

FIG. 25
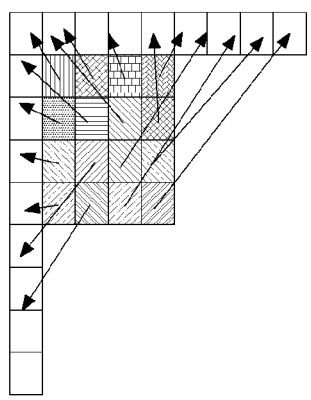
(a)
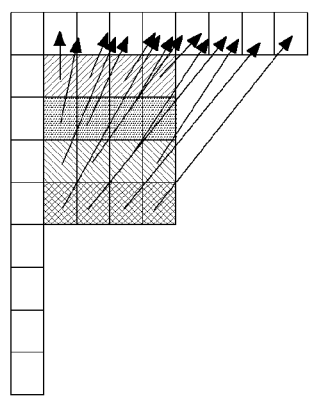
(b)
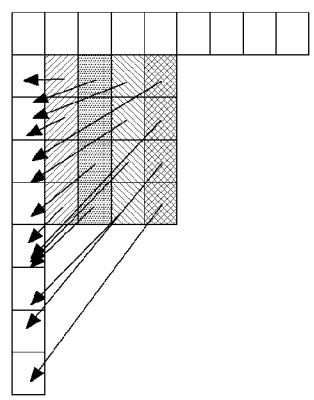
(c)
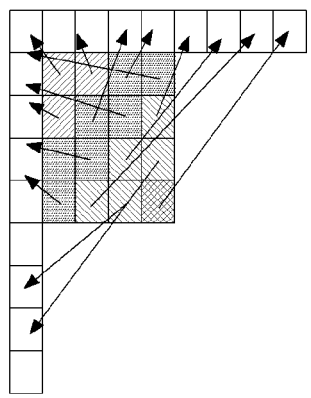
(d)
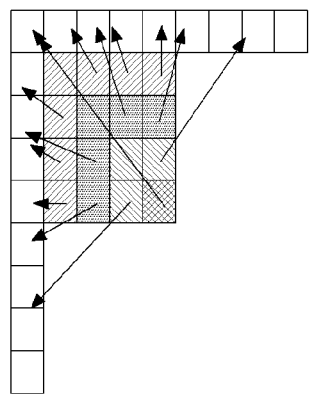
(e)

| Interpolated reference pixel position of c(x,y) when cuv=0.1 & cw0=1.0,cw1=1.2,cw2=1.4,cw3=1.6 ||||
|---|---|---|---|
| P(0.1,-1.0) | P(1.7,-1.0) | P(3.3,-1.0) | P(4.9,-1.0) |
| P(0.62,-1.0) | P(2.24,-1.0) | P(3.86,-1.0) | P(5.48,-1.0) |
| P(1.14,-1.0) | P(2.78,-1.0) | P(4.42,-1.0) | P(6.06,-1.0) |
| P(1.66,-1.0) | P(3.32,-1.0) | P(4.98,-1.0) | P(6.64,-1.0) |

FIG. 30

| Interpolated reference pixel position of c(x,y) when cuv=0.1 & cw0=1.0,cw1=1.2,cw2=1.4,cw3=1.6 ||||
|---|---|---|---|
| P(-1.9,-1.0) | P(0.3,-1.0) | P(1.3,-1.0) | P(2.9,-1.0) |
| P(-2.48,-1.0) | P(-0.86,-1.0) | P(0.76,-1.0) | P(2.38,-1.0) |
| P(-3.06,-1.0) | P(-1.42,-1.0) | P(0.22,-1.0) | P(1.86,-1.0) |
| P(-3.64,-1.0) | P(-1.98,-1.0) | P(-0.32,-1.0) | P(1.34,-1.0) |

FIG. 32

| Interpolated reference pixel position of c(x,y) when cuv=0.1 & cw0=1.0,cw1=1.2,cw2=1.4,cw3=1.6 ||||
|---|---|---|---|
| P(-1.0,0.1) | P(-1.0,0.62) | P(-1.0,1.14) | P(-1.0,1.66) |
| P(-1.0,1.7) | P(-1.0,2.24) | P(-1.0,2.78) | P(-1.0,3.32) |
| P(-1.0,3.3) | P(-1.0,3.86) | P(-1.0,4.42) | P(-1.0,4.98) |
| P(-1.0,4.9) | P(-1.0,5.48) | P(-1.0,5.98) | P(-1.0,6.64) |

| Interpolated reference pixel position of c(x,y) when cuv=0.1 & cw0=1.0,cw1=1.2,cw2=1.4,cw3=1.6 | | | |
|---|---|---|---|
| P(-1.0,-1.9) | P(-1.0,-2.48) | P(-1.0,-3.06) | P(-1.0,-3.64) |
| P(-1.0,-0.3) | P(-1.0,-0.86) | P(-1.0,-1.42) | P(-1.0,-1.98) |
| P(-1.0,1.3) | P(-1.0,0.76) | P(-1.0,0.22) | P(-1.0,-0.32) |
| P(-1.0,2.9) | P(-1.0,2.38) | P(-1.0,1.86) | P(-1.0,1.34) |

| Interpolated reference pixel position of c(x,y) when cuv=0.6 & cw0=1.0,cw1=1.4,cw2=1.8,cw3=2.2 | | | |
|---|---|---|---|
| P(0.0,-1.0) | P(1.0,-1.0) | P(2.0,-1.0) | P(3.0,-1.0) |
| P(0.84,-1.0) | P(1.84,-1.0) | P(2.84,-1.0) | P(3.84,-1.0) |
| P(2.16,-1.0) | P(3.16,-1.0) | P(4.16,-1.0) | P(5.16,-1.0) |
| P(3.96,-1.0) | P(4.96,-1.0) | P(5.96,-1.0) | P(6.96,-1.0) |

FIG. 38

| Interpolated reference pixel position of c(x,y) when cuv=0.6 & cw0=1.0,cw1=1.4,cw2=1.8,cw3=2.2 ||||
|---|---|---|---|
| P(0.0,-1.0) | P(1.0,-1.0) | P(2.0,-1.0) | P(3.0,-1.0) |
| P(-0.84,-1.0) | P(0.16,-1.0) | P(1.16,-1.0) | P(2.16,-1.0) |
| P(-2.16,-1.0) | P(-1.16,-1.0) | P(-0.16,-1.0) | P(0.84,-1.0) |
| P(-3.96,-1.0) | P(-2.96,-1.0) | P(-1.96,-1.0) | P(-0.96,-1.0) |

FIG. 40

| Interpolated reference pixel position of c(x,y) when cuv=0.6 & cw0=1.0,cw1=1.4,cw2=1.8,cw3=2.2 | | | |
|---|---|---|---|
| P(-1.0,0.0) | P(-1.0,0.84) | P(-1.0,2.16) | P(-1.0,3.96) |
| P(-1.0,1.0) | P(-1.0,1.84) | P(-1.0,3.16) | P(-1.0,4.96) |
| P(-1.0,2.0) | P(-1.0,2.84) | P(-1.0,4.16) | P(-1.0,5.96) |
| P(-1.0,3.0) | P(-1.0,3.84) | P(-1.0,5.16) | P(-1.0,6.96) |

FIG. 42

| Interpolated reference pixel position of c(x,y) when cuv=0.1 & cw0=1.0,cw1=1.2,cw2=1.4,cw3=1.6 ||||
|---|---|---|---|
| P(-1.0,0.0) | P(-1.0,-0.84) | P(-1.0,-2.16) | P(-1.0,-3.96) |
| P(-1.0,1.0) | P(-1.0,0.16) | P(-1.0,-1.16) | P(-1.0,-2.96) |
| P(-1.0,2.0) | P(-1.0,1.16) | P(-1.0,-0.16) | P(-1.0,-1.96) |
| P(-1.0,3.0) | P(-1.0,2.16) | P(-1.0,0.84) | P(-1.0,-0.96) |

FIG. 43
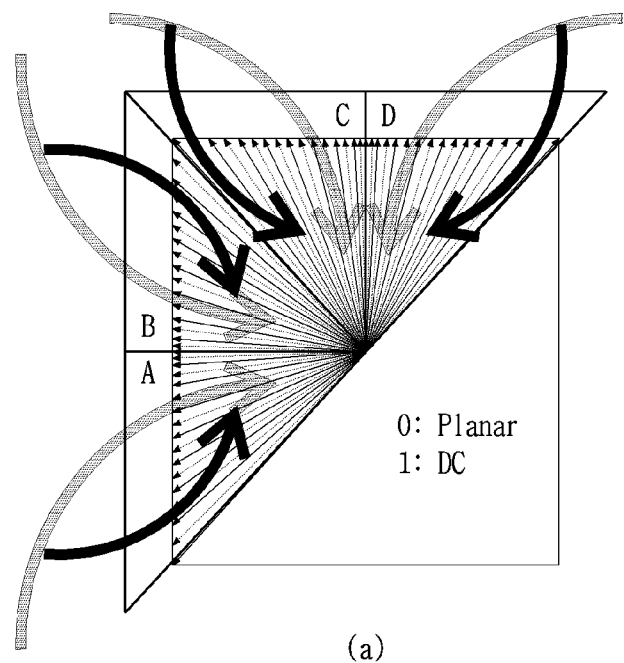
(a)
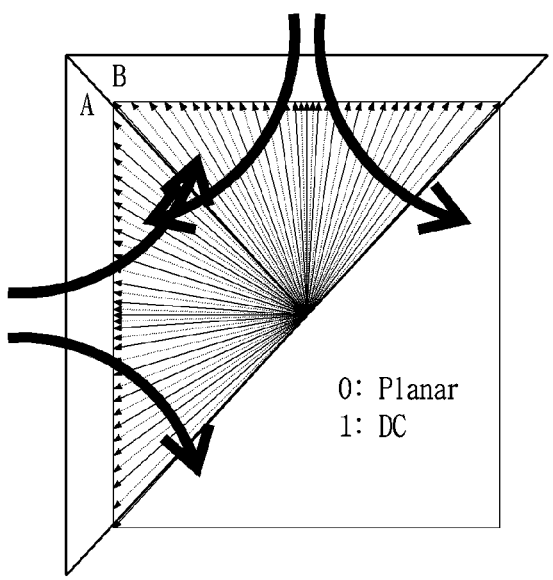
(b)

FIG. 44

| | |
|---|---|
| }else{ | |
| pbOffset=(PartMode==PART_NxN)?(nCbs/2):nCbs | |
| for(j=0;j<nCbs;j=j+pbOffset) | |
|   for(i=0;i<nCbs;i=i+pbOffset) | |
|     prev_intra_luma_pred_flag[x0+i][y0+j] | ae(v) |
|     cuv[x0+i][y0+j] | ae(v) |
|     cw[x0+i][y0+j][blkSize] | ae(v) |
| for(j=0;j<nCbs;j=j+pbOffset) | |
|   for(i=0;i<nCbs;i=i+pbOffset) | |
|     if(prev_intra_luma_pred_flag[x0+i][y0+j]) | |
|       mpm_idx[x0+i][y0+j] | ae(v) |
|     else | |
|       rem_intra_luma_pred_mode[x0+i][y0+j] | ae(v) |
| if(ChromaArrayType==3) | |
|   for(j=0;j<nCbs;j=j+pbOffset) | |
|     for(i=0;i<nCbs;i=i+pbOffset) | |
|       intra_chroma_pred_mode[x0+i][y0+j] | ae(v) |
| else if(ChromaArrayType !=0) | |
|   intra_chroma_pred_mode[x0][y0] | ae(v) |
| } | |

FIG. 45

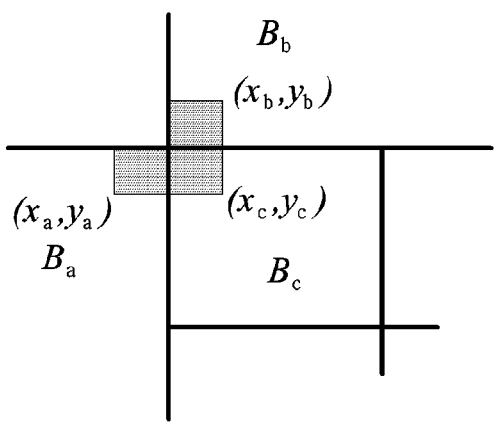

FIG. 46

| intra_chroma_pred_mode[xPb][yPb] | intraPredModeY[xPb][yPb] | | | | |
|:---:|:---:|:---:|:---:|:---:|:---:|
| | 0 | 26 | 10 | 1 | X(0 <= X <=34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

INTRA PREDICTION METHOD AND DEVICE

CROSS-REFERENCE TO RELATED APPLICATIONS

This application is a U.S. national stage application of International Application No. PCT/KR2017/006241 filed on Jun. 15, 2017, which claims the benefit of Korean Patent Application No. 10-2016-0078272 filed on Jun. 22, 2016 and Korean Patent Application No. 10-2016-0099618 filed on Aug. 4, 2016, in the Korean Intellectual Property Office, the entire disclosures of which are incorporated by reference for all purposes.

TECHNICAL FIELD

The present invention relates to a method and apparatus for encoding/decoding an image. Particularly, the present invention relates to a method and apparatus for intra prediction, more specifically, curved intra prediction.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

In conventional intra prediction, when performing directional intra prediction, only straight-directional prediction is used and thus there are limitations to enhance encoding efficiency.

DISCLOSURE

Technical Problem

The present invention is intended to provide an encoding/decoding method and apparatus for improving efficiency of encoding/decoding an image.

The present invention is intended to provide an encoding/decoding method and apparatus for improving efficiency of intra prediction.

The present invention is intended to provide a method and apparatus for performing straight-directional prediction and/or curved directional when performing intra prediction.

Technical Solution

An image decoding method according to the present invention may comprise: decoding information on intra prediction; and generating a prediction block by performing intra prediction for a current block based on the information on intra prediction.

According to an image decoding method of the present invention, the information on intra prediction may include information on an intra prediction mode, and the intra prediction mode may include a curved intra prediction mode.

According to an image decoding method of the present invention, the intra prediction mode of the current block may be a curved intra prediction mode, and the information on intra prediction may include direction information According to an image decoding method of the present invention, the information on intra prediction may include information specifying a position of a reference pixel.

According to an image decoding method of the present invention, the current block may include at least one pixel group including at least one pixel, and the information specifying the position of the reference pixel may be assigned in a unit of the pixel group.

According to an image decoding method of the present invention, the pixel group may be configured in a unit of at least one of a pixel unit, a horizontal line unit, a vertical line unit, a diagonal line unit, a right angle line unit, and a sub-block unit, each being included in the current block.

According to an image decoding method of the present invention, the information specifying the position of the reference pixel may include information on at least one curvature parameter or at least one weight parameter.

According to an image decoding method of the present invention, the information specifying the position of the reference pixel may be decoded based on at least one neighboring block of the current block.

According to an image decoding method of the present invention, the at least one curvature parameter or the at least one weight parameter is decoded by using a default value and a delta value.

According to an image decoding method of the present invention, the information on intra prediction may include information on application of curved intra prediction, the information on application of curved intra prediction may be decoded in a predetermined unit, and the predetermined unit may be at least one of a video, a sequence, a picture, a slice, a tile, a coding tree unit, a coding unit, a prediction unit and a transform unit.

An image decoding apparatus according to the present invention may comprise a decoder for decoding information on intra prediction; and an intra predictor for generating a prediction block by performing intra prediction for a current block based on the information on intra prediction.

According to an image decoding apparatus of the present invention, the information on intra prediction may include information on an intra prediction mode, and the intra prediction mode may include a curved intra prediction mode.

An image encoding method according to the present invention may comprise generating a prediction block by performing intra prediction for a current block; and encoding information on the intra prediction.

According to an image encoding method of the present invention, the information on intra prediction may include information on an intra prediction mode, and the intra prediction mode may include a curved intra prediction mode.

According to an image encoding method of the present invention, the intra prediction mode of the current block may be a curved intra prediction mode, and the information on intra prediction may include direction information.

According to an image encoding method of the present invention, the information on intra prediction may include information specifying a position of a reference pixel.

According to an image encoding method of the present invention, the current block may include at least one pixel group including at least one pixel, and the information specifying the position of the reference pixel may be assigned in a unit of the pixel group.

According to an image encoding method of the present invention, the pixel group may be configured in a unit of at least one of a pixel unit, a horizontal line unit, a vertical line unit, a diagonal line unit, a right angle line unit, and a sub-block unit, each being included in the current block.

According to an image encoding method of the present invention, the information specifying the position of the reference pixel may include information on at least one curvature parameter or at least one weight parameter.

According to an image encoding method of the present invention, the information specifying the position of the reference pixel may be encoded based on at least one neighboring block of the current block.

According to an image encoding method of the present invention, the at least one curvature parameter or the at least one weight parameter may be encoded by using a default value and a delta value.

An image encoding apparatus according to the present invention may comprise an intra predictor for generating a prediction block by performing intra prediction for a current block; and an encoder for encoding information on the intra prediction.

According to an image encoding apparatus of the present invention, the information on intra prediction may include information on an intra prediction mode, and the intra prediction mode may include a curved intra prediction mode A recording medium according to the present invention may store a bitstream generated by an image encoding method according to the present invention.

Advantageous Effects

By the present invention, efficiency of encoding/decoding an image may be improved.

By the present invention, encoding/decoding efficiency of intra prediction of an image may be improved.

By the present invention, intra prediction may be performed by using straight-directional prediction and/or curved prediction.

DESCRIPTION OF DRAWINGS

FIG. 7 is a view for explaining an embodiment of a process of inter prediction.

FIG. 8 is a view for explaining transform sets according to intra-prediction modes.

FIG. 20 is a view showing an embodiment of angles between each straight-directional mode and a vertical direction among intra prediction modes predModeIntra including 33 straight-directional modes.

FIG. 25 is a view showing an embodiment using reference pixels having different angles according to a position of a pixel within the prediction block.

FIG. 30 is a view showing an embodiment, as a result of applying cuv and $cw_i$ of FIG. 29, of a position of a reference pixel used by a prediction pixel within a current block.

FIG. 32 is a view showing an embodiment, as a result of applying cuv and $cw_i$ of FIG. 31, of a position of a reference pixel used by a prediction pixel within a current block.

FIG. 38 is a view showing an embodiment, as a result of applying cuv and $cw_i$ of FIG. 37, of a position of a reference pixel used by a prediction pixel within the current block.

FIG. 40 is a view showing an embodiment, as a result of applying cuv and $cw_i$ of FIG. 39, of a position of a reference pixel used by a prediction pixel within the current block.

FIG. 42 is a view showing an embodiment, as a result of applying cuv and $cw_i$ of FIG. 41, of a position of a reference pixel used by a prediction pixel within the current block.

FIG. 43 is a view showing another embodiment of curved intra prediction.

FIG. 44 is a view showing an embodiment of a syntax structure of a bitstream including information on intra prediction according to the present disclosure.

FIG. 45 is a view exemplary showing two blocks $B_a$ and $B_b$ adjacent to a current block $B_c$ and which have been already encoded/decoded.

FIG. 46 is a view showing encoding/decoding of an intra prediction mode of a current block of a chroma component.

MODE FOR INVENTION

Figure 1:
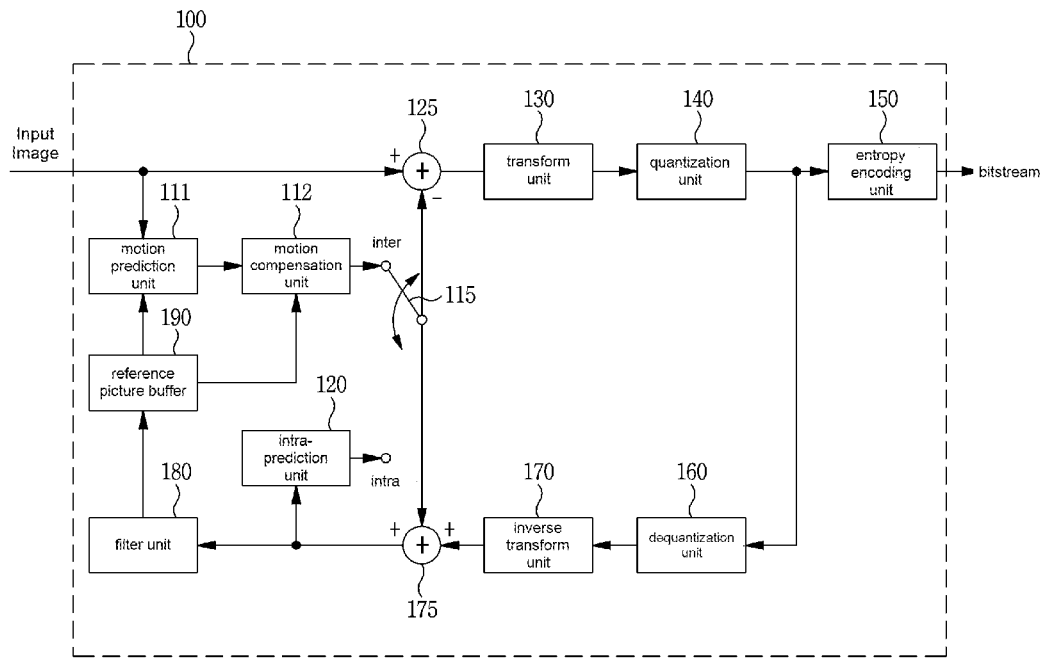
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Term Description

Encoder: may mean an apparatus performing encoding.
Decoder: may mean an apparatus performing decoding.
Parsing: may mean determination of a value of a syntax element by performing entropy decoding, or may mean the entropy decoding itself.
Block: may mean a sample of an M×N matrix. Here, M and N are positive integers, and the block may mean a sample matrix in a two-dimensional form.
Sample: is a basic unit of a block, and may indicate a value ranging 0 to 2 Bd−1 depending on the bit depth (Bd). The sample may mean a pixel in the present invention.
Unit: may mean a unit of encoding and decoding of an image. In encoding and decoding an image, the unit may be an area generated by partitioning one image. In addition, the unit may mean a subdivided unit when one image is partitioned into subdivided units during encoding or decoding. In encoding and decoding an image, a predetermined process for each unit may be performed. One unit may be partitioned into sub units that have sizes smaller than the size of the unit. Depending on functions, the unit may mean a block, a macroblock, a coding tree unit, a coding tree block, a coding unit, a coding block, a prediction unit, a prediction block, a transform unit, a transform block, etc. In addition, in order to distinguish a unit from a block, the unit may include a luma component block, a chroma component block of the luma component block, and a syntax element of each color component block. The unit may have various sizes and shapes, and particularly, the shape of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Reconstructed Neighbor Unit: may mean a reconstructed unit that is previously spatially/temporally encoded or decoded, and the reconstructed unit is adjacent to an encoding/decoding target unit. Here, a reconstructed neighbor unit may mean a reconstructed neighbor block.

Neighbor Block: may mean a block adjacent to an encoding/decoding target block. The block adjacent to the encoding/decoding target block may mean a block having a boundary being in contact with the encoding/decoding target block. The neighbor block may mean a block located at an adjacent vertex of the encoding/decoding target block. The neighbor block may mean a reconstructed neighbor block.

Unit Depth: may mean a partitioned degree of a unit. In a tree structure, a root node may be the highest node, and a leaf node may be the lowest node.

Symbol: may mean a syntax element of the encoding/decoding target unit, a coding parameter, a value of a transform coefficient, etc.

Parameter Set: may mean header information in a structure of the bitstream. The parameter set may include at least one of a video parameter set, a sequence parameter set, a picture parameter set, or an adaptation parameter set. In addition, the parameter set may mean slice header information and tile header information, etc.

Bitstream: may mean a bit string including encoded image information.

Prediction Unit: may mean a basic unit when performing inter prediction or intra prediction, and compensation for the prediction. One prediction unit may be partitioned into a plurality of partitions. In this case, each of the plurality of partitions may be a basic unit while performing the predictions and the compensation, and each partition partitioned from the prediction unit may be a prediction unit. In addition, one prediction unit may be partitioned into a plurality of small prediction units. A prediction unit may have various sizes and shapes, and particularly, the shape of the prediction unit may be a two-dimensional geometrical figure such as a rectangular shape, a square shape, a trapezoid shape, a triangular shape, a pentagonal shape, etc.

Prediction Unit Partition: may mean the shape of a partitioned prediction unit.

Reference Picture List: may mean a list including at least one reference picture that is used for inter prediction or motion compensation. Types of the reference picture list may be List Combined (LC), List 0 (L0), List 1 (L1), List 2 (L2), List 3 (L3), etc. At least one reference picture list may be used for inter prediction.

Inter-Prediction Indicator: may mean one of the inter-prediction direction (one-way directional prediction, bidirectional prediction, etc.) of an encoding/decoding target block in a case of inter prediction, the number of reference pictures used for generating a prediction block by the encoding/decoding target block, and the number of reference blocks used for performing inter prediction or motion compensation by the encoding/decoding target block.

Reference Picture Index: may mean an index of a specific reference picture in the reference picture list.

Reference Picture: may mean a picture to which a specific unit refers for inter prediction or motion compensation. A reference image may be referred to as the reference picture.

Motion Vector: is a two-dimensional vector used for inter prediction or motion compensation, and may mean an offset between an encoding/decoding target picture and the reference picture. For example, (mvX, mvY) may indicate the motion vector, mvX may indicate a horizontal component, and mvY may indicate a vertical component.

Motion Vector Candidate: may mean a unit that becomes a prediction candidate when predicting the motion vector, or may mean a motion vector of the unit.

Motion Vector Candidate List: may mean a list configured by using the motion vector candidate.

Motion Vector Candidate Index: may mean an indicator that indicates the motion vector candidate in the motion vector candidate list. The motion vector candidate index may be referred to as an index of a motion vector predictor.

Motion Information: may mean the motion vector, the reference picture index, and inter-prediction indicator as well as information including at least one of reference picture list information, the reference picture, the motion vector candidate, the motion vector candidate index, etc.

Merge Candidate List: may mean a list configured by using the merge candidate.

Merge Candidate: may include a spatial merge candidate, a temporal merge candidate, a combined merge candidate, a combined bi-prediction merge candidate, a zero merge candidate, etc. The merge candidate may include motion information such as prediction type information, a reference picture index for each list, a motion vector, etc.

Merge Index: may mean information indicating the merge candidate in the merge candidate list. In addition, the merge index may indicate a block, which derives the merge candidate, among reconstructed blocks spatially/temporally adjacent to the current block. In addition, the merge index may indicate at least one of pieces of motion information of the merge candidate.

Transform Unit: may mean a basic unit when performing encoding/decoding of a residual signal, similar to transform, inverse transform, quantization, dequantization, and transform coefficient encoding/decoding. One transform unit may be partitioned into a plurality of small transform units. The transform unit may have various sizes and shapes. Particularly, the shape of the transform unit may be a two-dimensional geometrical figure such as a rectangular shape, a square shape, a trapezoid shape, a triangular shape, a pentagonal shape, etc.

Scaling: may mean a process of multiplying a factor to a transform coefficient level, and as a result, a transform coefficient may be generated. The scaling may be also referred to as dequantization.

Quantization Parameter: may mean a value used in scaling the transform coefficient level during quantization and dequantization. Here, the quantization parameter may be a value mapped to a step size of the quantization.

Delta Quantization Parameter: may mean a difference value between a predicted quantization parameter and a quantization parameter of the encoding/decoding target unit.

Scan: may mean a method of sorting coefficient orders within a block or a matrix. For example, sorting a two-dimensional matrix into a one-dimensional matrix may be referred to as scanning, and sorting a one-dimensional matrix into a two-dimensional matrix may be referred to as scanning or inverse scanning.

Transform Coefficient: may mean a coefficient value generated after performing a transform. In the present invention, a quantized transform coefficient level that is a transform coefficient to which the quantization is applied may be referred to as the transform coefficient.

Non-zero Transform Coefficient: may mean a transform coefficient in which a value thereof is not 0, or may mean a transform coefficient level in which a value thereof is not 0.

Quantization Matrix: may mean a matrix used in quantization and dequantization in order to enhance subject quality or object quality of an image. The quantization matrix may be referred to as a scaling list.

Quantization Matrix Coefficient: may mean each element of a quantization matrix. The quantization matrix coefficient may be referred to as a matrix coefficient.

Default Matrix: may mean a predetermined quantization matrix that is defined in the encoder and the decoder in advance.

Non-default Matrix: may mean a quantization matrix that is signaled by a user without being previously defined in the encoder and the decoder.

Coding Tree Unit: may be composed of one luma component (Y) coding tree unit and related two chroma components (Cb, Cr) coding tree units. Each coding tree unit may be partitioned by using at least one partition method such as a quad tree, a binary tree, etc. to configure sub units such as coding units, prediction units, transform units, etc. The coding tree unit may be used as a term for indicating a pixel block that is a processing unit in decoding/encoding process of an image, like partition of an input image.

Coding Tree Block: may be used as a term for indicating one of the Y coding tree unit, the Cb coding tree unit, and the Cr coding tree unit.

FIG. 1 is a block diagram showing configurations of an encoding apparatus according to an embodiment of the present invention.

The encoding apparatus 100 may be a video encoding apparatus or an image encoding apparatus. A video may include one or more images. The encoding apparatus 100 may encode the one or more images of the video in order of time.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

The encoding apparatus 100 may encode an input picture in an intra mode or an inter mode or both. In addition, the encoding apparatus 100 may generate a bitstream by encoding the input picture, and may output the generated bitstream. When the intra mode is used as a prediction mode, the switch 115 may be switched to intra. When the inter mode is used as a prediction mode, the switch 115 may be switched to inter. Here, the intra mode may be referred to as an intra-prediction mode, and the inter mode may be referred to as an inter-prediction mode. The encoding apparatus 100 may generate a prediction block of an input block of the input picture. In addition, after generating the prediction block, the encoding apparatus 100 may encode residuals between the input block and the prediction block. The input picture may be referred to as a current image that is a target of current encoding. The input block may be referred to as a current block or as an encoding target block that is a target of the current encoding.

When the prediction mode is the intra mode, the intra-prediction unit 120 may use a pixel value of a previously encoded block, which is adjacent to the current block, as a reference pixel. The intra-prediction unit 120 may perform spatial prediction by using the reference pixel, and may generate prediction samples of the input block by using the spatial prediction. Here, intra prediction may mean intra-frame prediction.

When the prediction mode is the inter mode, the motion prediction unit 111 may search for a region that is optimally matched with the input block from a reference picture in a motion predicting process, and may derive a motion vector by using the searched region. The reference picture may be stored in the reference picture buffer 190.

The motion compensation unit 112 may generate the prediction block by performing motion compensation using the motion vector. Here, the motion vector may be a two-dimensional vector that is used for inter prediction. In addition, the motion vector may indicate offset between the current picture and the reference picture. Here, inter prediction may be mean inter-frame prediction.

When a value of the motion vector is not an integer, the motion prediction unit 111 and the motion compensation unit 112 may generate the prediction block by applying an interpolation filter to a partial region in the reference picture. In order to perform inter prediction or motion compensation, on the basis of the coding unit, it is possible to determine which methods the motion prediction and compensation methods of a prediction unit in the coding unit uses among the skip mode, the merge mode, the AMVP mode, and a current picture reference mode. Inter prediction or motion compensation may be performed according to each mode. Here, the current picture reference mode may mean a prediction mode using a pre-reconstructed region of a current picture having an encoding target block. In order to specify the pre-reconstructed region, a motion vector for the current picture reference mode may be defined. Whether the encoding target block is encoded in the current picture reference mode may be encoded by using a reference picture index of the encoding target block.

The subtractor 125 may generate a residual block by using the residuals between the input block and the prediction block. The residual block may be referred to as a residual signal.

The transform unit 130 may generate a transform coefficient by transforming the residual block, and may output the transform coefficient. Here, the transform coefficient may be a coefficient value generated by transforming the residual block. In a transform skip mode, the transform unit 130 may skip the transforming of the residual block.

A quantized transform coefficient level may be generated by applying quantization to the transform coefficient. Hereinafter, the quantized transform coefficient level may be referred to as the transform coefficient in the embodiment of the present invention.

The quantization unit 140 may generate the quantized transform coefficient level by quantizing the transform coefficient depending on the quantization parameter, and may output the quantized transform coefficient level. Here, the quantization unit 140 may quantize the transform coefficient by using a quantization matrix.

The entropy encoding unit 150 may generate the bitstream by performing entropy encoding according to the probability distribution, on values calculated by the quantization unit 140 or on coding parameter values calculated in an encoding process, etc., and may output the generated bitstream. The entropy encoding unit 150 may perform the entropy encoding on information for decoding an image, and on information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression efficiency of the image encoding may be increased through the entropy encoding. For the entropy encoding, the entropy encoding unit 150 may use an encoding method such as exponential Golomb, context-adaptive variable length coding (CAVLC), and context-adaptive binary arithmetic coding (CABAC). For example, the entropy encoding unit 150 may perform the entropy encoding by using a variable length coding/code (VLC) table. In addition, the entropy encoding unit 150 may derive a binarization method of the target symbol and a probability model of the target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional form coefficient may be changed into the one-dimensional vector form by scanning the coefficient of the block with up-right scanning. According to the size of the transform unit and the intra-prediction mode, instead of the up-right scanning, it is possible to use vertical direction scanning for scanning the two-dimensional block form coefficient in a column direction, and horizontal direction scanning for scanning the two-dimensional block form coefficient in a row direction. That is, it is possible to determine which scanning method among up-right scanning, vertical direction scanning, and horizontal direction scanning is to be used depending on the size of the transform unit and the intra-prediction mode.

The coding parameter may include information, such as the syntax element, which is encoded by the encoder and is signaled to the decoder, and may include information that may be derived in the encoding or decoding process. The coding parameter may mean information that is necessary to encode or decode an image. For example, the coding parameter may include at least one value or combined form of the block size, the block depth, the block partition information, the unit size, the unit depth, the unit partition information, the partition flag of a quad-tree form, the partition flag of a binary-tree form, the partition direction of a binary-tree form, the intra-prediction mode, the intra-prediction direction, the reference sample filtering method, the prediction block boundary filtering method, the filter tap, the filter coefficient, the inter-prediction mode, the motion information, the motion vector, the reference picture index, the inter-prediction direction, the inter-prediction indicator, the reference picture list, the motion vector predictor, the motion vector candidate list, the information about whether or not the motion merge mode is used, the motion merge candidate, motion merge candidate list, the information about whether or not the skip mode is used, interpolation filter type, the motion vector size, accuracy of motion vector representation, the transform type, the transform size, the information about whether additional (secondary) transform is used, the information about whether or not a residual signal is present, the coded block pattern, the coded block flag, the quantization parameter, the quantization matrix, the filter information within a loop, the information about whether or not a filter is applied within a loop, the filter coefficient within a loop, binarization/inverse binarization method, the context model, the context bin, the bypass bin, the transform coefficient, transform coefficient level, transform coefficient level scanning method, the image display/output order, slice identification information, slice type, slice partition information, tile identification information, tile type, tile partition information, the picture type, bit depth, and the information of a luma signal or a chroma signal.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal of a block unit.

When the encoding apparatus 100 performs encoding by using inter prediction, the encoded current picture may be used as a reference picture for another image(s) that will be processed thereafter. Accordingly, the encoding apparatus 100 may decode the encoded current picture, and may store the decoded image as the reference picture. In order to perform the decoding, dequantization and inverse transform may be performed on the encoded current picture.

A quantized coefficient may be dequantized by the dequantization unit 160, and may be inversely transformed by the inverse transform unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed picture. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel.

The sample adaptive offset may add an optimum offset value to the pixel value in order to compensate for an encoding error. The sample adaptive offset may correct an offset between the deblocking filtered image and the original picture for each pixel. In order to perform the offset correction on a specific picture, it is possible to use a method of applying an offset in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information about whether or not the adaptive loop filter is applied to the luma signal may be signaled for each coding unit (CU). A shape and a filter coefficient of an adaptive loop filter being applied to each block may vary. In addition, an adaptive loop filter having the same form (fixed form) may be applied regardless of characteristics of a target block.

The reconstructed block that passed the filter unit 180 may be stored in the reference picture buffer 190.

Figure 2:
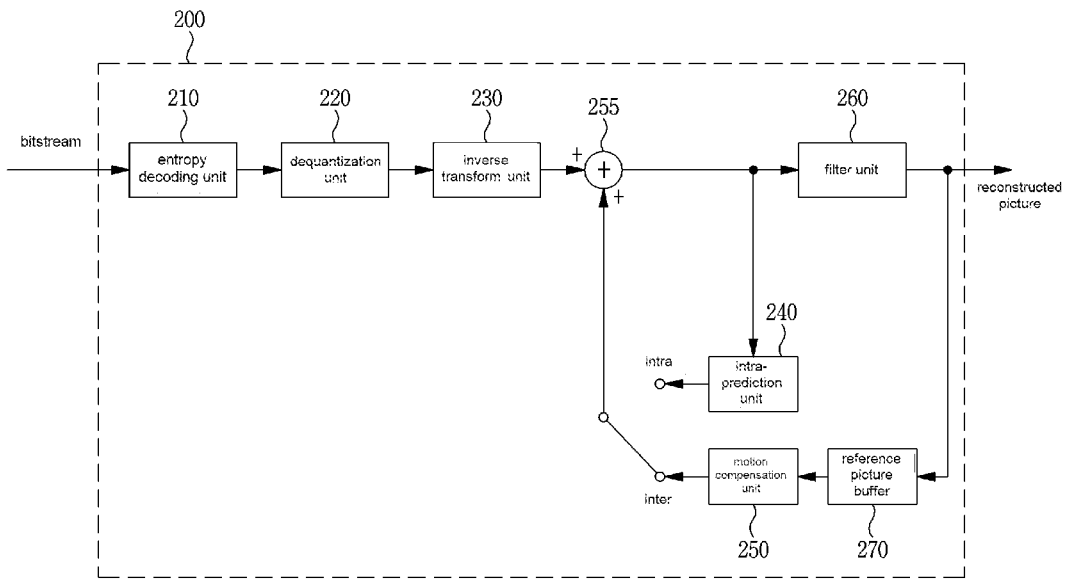
FIG. 2 is a block diagram showing configurations of a decoding apparatus according to an embodiment of the present invention.

FIG. 2 is a block diagram showing configurations of a decoding apparatus according to an embodiment of the present invention.

The decoding apparatus 200 may be a video decoding apparatus or an image decoding apparatus.

Referring to FIG. 2, the decoding apparatus 200 may include an entropy decoding unit 210, a dequantization unit 220, an inverse transform unit 230, an intra-prediction unit 240, a motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed picture by performing decoding, and may output the reconstructed picture.

When a prediction mode used in decoding is the intra mode, the switch may be switched to intra. When the prediction mode used in decoding is the inter mode, the switch may be switched to inter.

The decoding apparatus 200 may obtain the reconstructed residual block from the inputted bitstream, and may generate the prediction block. When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by performing entropy decoding on the bitstream according to the probability distribution. The generated symbols may include a symbol having a quantized transform coefficient level. Here, a method of entropy decoding may be similar to the above-described method of the entropy encoding. For example, the method of the entropy decoding may be an inverse process of the above-described method of the entropy encoding.

In order to decode the transform coefficient level, the entropy decoding unit 210 may perform transform coefficient scanning, whereby the one-dimensional vector form coefficient can be changed into the two-dimensional block form. For example, the one-dimensional vector form coefficient may be changed into a two-dimensional block form by scanning the coefficient of the block with up-right scanning. According to the size of the transform unit and the intra-prediction mode, instead of up-right scanning, it is possible to use vertical direction scanning and horizontal direction scanning. That is, it is possible to determine which scanning method among up-right scanning, vertical direction scanning, and horizontal direction scanning is used depending on the size of the transform unit and the intra-prediction mode.

The quantized transform coefficient level may be dequantized by the dequantization unit 220, and may be inversely transformed by the inverse transform unit 230. The quantized transform coefficient level is dequantized and is inversely transformed so as to generate a reconstructed residual block. Here, the dequantization unit 220 may apply the quantization matrix to the quantized transform coefficient level.

When the intra mode is used, the intra-prediction unit 240 may generate a prediction block by performing the spatial prediction that uses the pixel value of the previously decoded block that is adjacent to the decoding target block.

When the inter mode is used, the motion compensation unit 250 may generate the prediction block by performing motion compensation that uses both the motion vector and the reference picture stored in the reference picture buffer 270. When the value of the motion vector is not an integer, the motion compensation unit 250 may generate the prediction block by applying the interpolation filter to the partial region in the reference picture. In order to perform motion compensation, on the basis of the coding unit, it is possible to determine which method the motion compensation method of a prediction unit in the coding unit uses among the skip mode, the merge mode, the AMVP mode, and a current picture reference mode. In addition, it is possible to perform motion compensation depending on the modes. Here, the current picture reference mode may mean a prediction mode using a previously reconstructed region within the current picture having the decoding target block. The previously reconstructed region may not be adjacent to the decoding target block. In order to specify the previously reconstructed region, a fixed vector may be used for the current picture reference mode. In addition, a flag or an index indicating whether or not the decoding target block is a block decoded in the current picture reference mode may be signaled, and may be derived by using the reference picture index of the decoding target block. The current picture for the current picture reference mode may exist at a fixed position (for example, a position of a reference picture index is 0 or the last position) within the reference picture list for the decoding target block. In addition, it is possible for the current picture to be variably positioned within the reference picture list, and to this end, it is possible to signal the reference picture index indicating a position of the current picture. Here, signaling a flag or an index may mean entropy encoding the corresponding flag or index and including it into a bitstream at an encoder, and may mean entropy decoding the corresponding flag or index from a bitstream at a decoder.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed picture. The filter unit 260 may output the reconstructed picture. The reconstructed picture may be stored in the reference picture buffer 270, and may be used for inter prediction.

Figure 3:
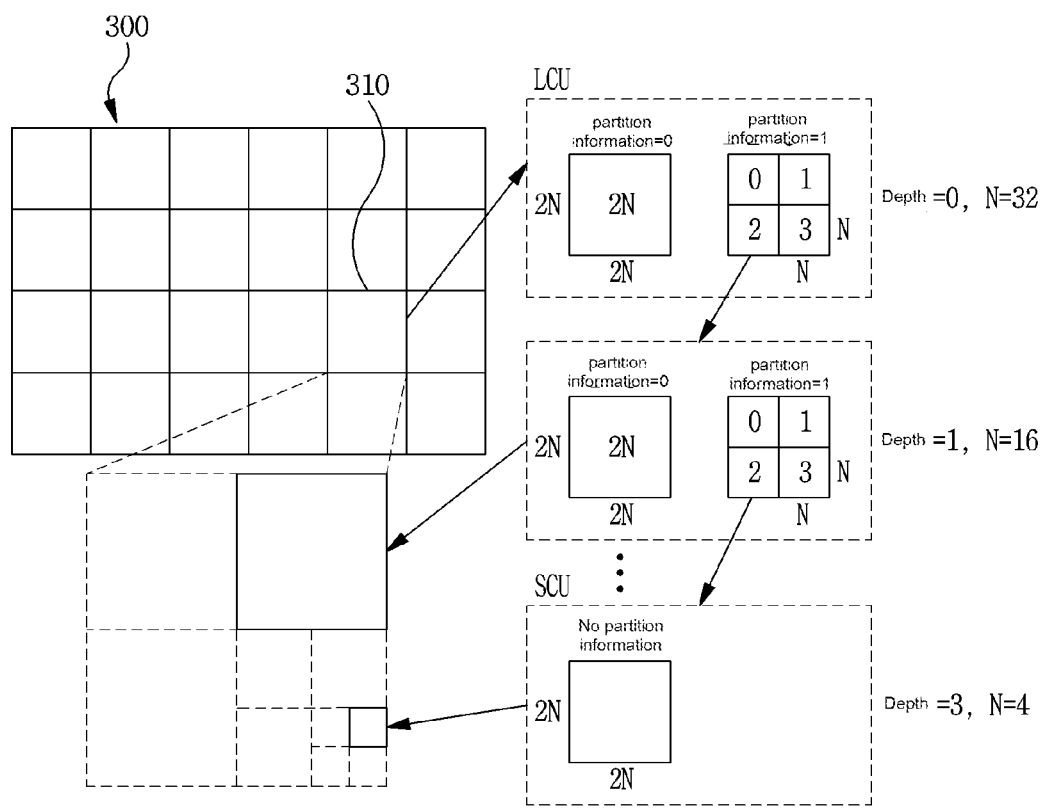
FIG. 3 is a view schematically showing a partition structure of an image when encoding and decoding the image.

FIG. 3 is a view schematically showing a partition structure of an image when encoding and decoding the image. FIG. 3 schematically shows an embodiment of partitioning one unit into a plurality of sub-units.

In order to efficiently partition an image, a coding unit (CU) may be used in encoding and decoding. Here, the coding unit may mean an encoding unit. The unit may be a combination of 1) a syntax element and 2) a block including image samples. For example, "partition of a unit" may mean "partition of a block relative to a unit". The block partition information may include information about the unit depth. Depth information may indicate the number of times a unit is partitioned or a partitioned degree of a unit or both.

Referring to FIG. 3, an image 300 is sequentially partitioned for each largest coding unit (LCU), and a partition structure is determined for each LCU. Here, the LCU and a coding tree unit (CTU) have the same meaning. One unit may have depth information based on a tree structure, and may be hierarchically partitioned. Each of the partitioned sub-units may have depth information. The depth information indicates the number of times a unit is partitioned or a partitioned degree of a unit or both, and thus, the depth information may include information about the size of the sub-unit.

The partition structure may mean distribution of a coding unit (CU) in the LCU 310. The CU may be a unit for efficiently encoding/decoding an image. The distribution may be determined on the basis of whether or not one CU will be partitioned in plural (a positive integer equal to or more than 2 including 2, 4, 8, 16, etc.). The width size and the height size of the partitioned CU may respectively be a half width size and a half height size of the original CU. Alternatively, according to the number of partitionings, the width size and the height size of the partitioned CU may respectively be smaller than the width size and the height size of the original CU. The partitioned CU may be recursively partitioned into a plurality of further partitioned CUs, wherein the further partitioned CU has a width size and a height size smaller than those of the partitioned CU in the same partition method.

Here, the partition of a CU may be recursively performed up to a predetermined depth. Depth information may be information indicating a size of the CU, and may be stored in each CU. For example, the depth of the LCU may be 0, and the depth of a smallest coding unit (SCU) may be a predetermined maximum depth. Here, the LCU may be a coding unit having a maximum size as described above, and the SCU may be a coding unit having a minimum size.

Whenever the LCU 310 begins to be partitioned, and the width size and the height size of the CU are decreased by the partitioning, the depth of a CU is increased by 1. In a case of a CU which cannot be partitioned, the CU may have a 2N×2N size for each depth. In a case of a CU that can be partitioned, the CU having a 2N×2N size may be partitioned into a plurality of N×N-size CUs. The size of N is reduced by half whenever the depth is increased by 1.

For example, when one coding unit is partitioned into four sub-coding units, a width size and a height size of one of the four sub-coding units may respectively be a half width size and a half height size of the original coding unit. For example, when a 32×32-size coding unit is partitioned into four sub-coding units, each of the four sub-coding units may have a 16×16 size. When one coding unit is partitioned into four sub-coding units, the coding unit may be partitioned in a quad-tree form.

For example, when one coding unit is partitioned into two sub-coding units, a width size or a height size of one of the two sub-coding units may respectively be a half width size or a half height size of the original coding unit. For example, when a 32×32-size coding unit is vertically partitioned into two sub-coding units, each of the two sub-coding units may have a 16×32 size. For example, when a 32×32-size coding unit is horizontally partitioned into two sub-coding units, each of the two sub-coding units may have a 32×16 size. When one coding unit is partitioned into two sub-coding units, the coding unit may be partitioned in a binary-tree form.

Referring to FIG. 3, the size of the LCU having a minimum depth of 0 may be 64×64 pixels, and the size of the SCU having a maximum depth of 3 may be 8×8 pixels. Here, a CU having 64×64 pixels, which is the LCU, may be denoted by a depth of 0, a CU having 32×32 pixels may be denoted by a depth of 1, a CU having 16×16 pixels may be denoted by a depth of 2, and a CU having 8×8 pixels, which is the SCU, may be denoted by a depth of 3.

In addition, information about whether or not a CU will be partitioned may be represented through partition information of a CU. The partition information may be 1 bit information. The partition information may be included in all CUs other than the SCU. For example, when a value of the partition information is 0, a CU may not be partitioned, and when a value of the partition information is 1, a CU may be partitioned.

Figure 4:
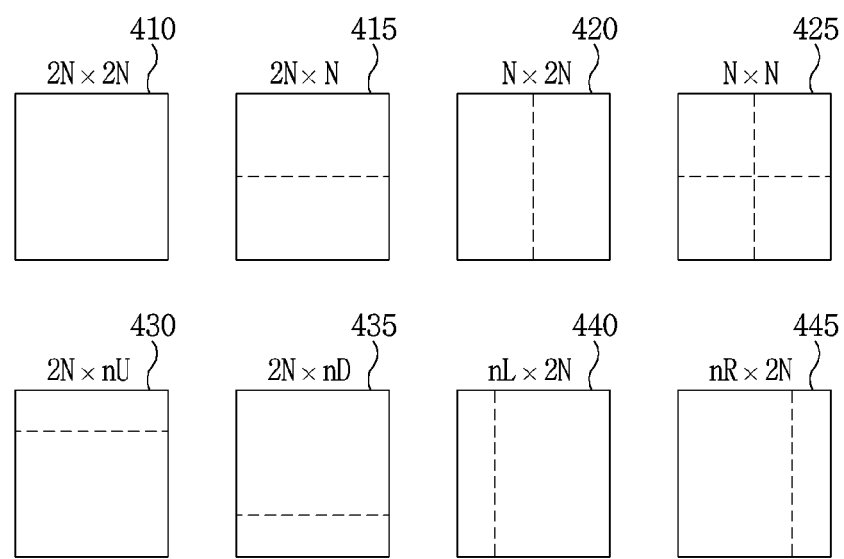
FIG. 4 is a view showing forms of a prediction unit (PU) that may be included in a coding unit (CU).

FIG. 4 is a view showing forms of a prediction unit (PU) that may be included in a coding unit (CU).

A CU that is no longer partitioned, from among CUs partitioned from the LCU, may be partitioned into at least one prediction unit (PU). This process may be also referred to as a partition.

The PU may be a basic unit for prediction. The PU may be encoded and decoded in any one of a skip mode, an inter mode, and an intra mode. The PU may be partitioned in various forms depending on the modes.

In addition, the coding unit may not be partitioned into a plurality of prediction units, and the coding unit and the prediction unit have the same size.

As shown in FIG. 4, in the skip mode, the CU may not be partitioned. In the skip mode, a 2N×2N mode 410 having the same size as a CU without partition may be supported.

In the inter mode, 8 partitioned forms may be supported within a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported. In the intra mode, the 2N×2N mode 410 and the N×N mode 425 may be supported.

One coding unit may be partitioned into one or more prediction units. One prediction unit may be partitioned into one or more sub-prediction units.

For example, when one prediction unit is partitioned into four sub-prediction units, a width size and a height size of one of the four sub-prediction units may be a half width size and a half height size of the original prediction unit. For example, when a 32×32-size prediction unit is partitioned into four sub-prediction units, each of the four sub-prediction units may have a 16×16 size. When one prediction unit is partitioned into four sub-prediction units, the prediction unit may be partitioned in the quad-tree form.

For example, when one prediction unit is partitioned into two sub-prediction units, a width size or a height size of one of the two sub-prediction units may be a half width size or a half height size of the original prediction unit. For example, when a 32×32-size prediction unit is vertically partitioned into two sub-prediction units, each of the two sub-prediction units may have a 16×32 size. For example, when a 32×32-size prediction unit is horizontally partitioned into two sub-prediction units, each of the two sub-prediction units may have a 32×16 size. When one prediction unit is partitioned into two sub-prediction units, the prediction unit may be partitioned in the binary-tree form.

Figure 5:
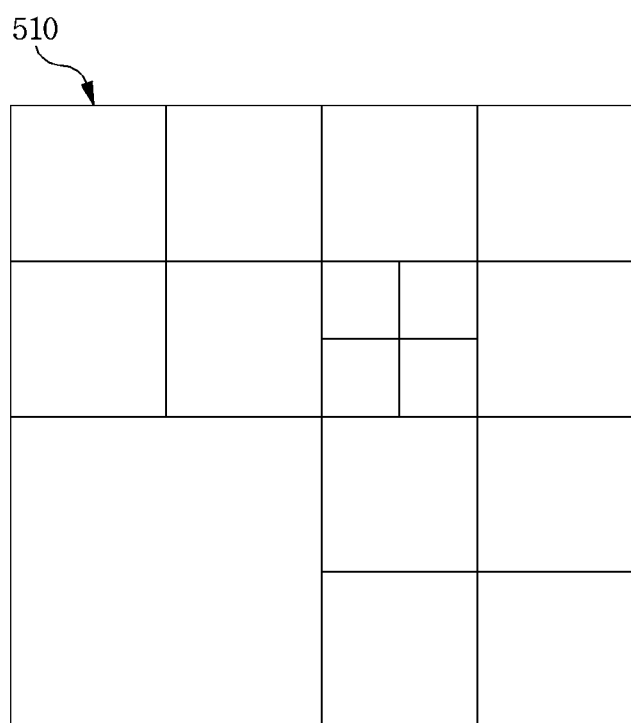
FIG. 5 is a view showing forms of a transform unit (TU) that may be included in a coding unit (CU).

FIG. 5 is a view showing forms of a transform unit (TU) that may be included in a coding unit (CU).

A transform unit (TU) may be a basic unit used for a transform, quantization, a reverse transform, and dequantization within a CU. The TU may have a square shape or a rectangular shape, etc. The TU may be dependently determined by a size of a CU or a form of a CU or both.

A CU that is no longer partitioned among CUs partitioned from the LCU may be partitioned into at least one TU. Here, the partition structure of the TU may be a quad-tree structure. For example, as shown in FIG. 5, one CU 510 may be partitioned once or more depending on the quad-tree structure. The case where one CU is partitioned at least once may be referred to as recursive partition. Through the partitioning, one CU 510 may be formed of TUs having various sizes. Alternatively, a CU may be partitioned into at least one TU depending on the number of vertical lines partitioning the CU or the number of horizontal lines partitioning the CU or both. The CU may be partitioned into TUs that are symmetrical to each other, or may be partitioned into TUs that are asymmetrical to each other. In order to partition the CU into TUs that are symmetrical to each other, information of a size/shape of the TU may be signaled, and may be derived from information of a size/shape of the CU.

In addition, the coding unit may not be partitioned into transform units, and the coding unit and the transform unit may have the same size.

One coding unit may be partitioned into at least one transform unit, and one transform unit may be partitioned into at least one sub-transform unit.

For example, when one transform unit is partitioned into four sub-transform units, a width size and a height size of one of the four sub-transform units may respectively be a half width size and a half height size of the original transform unit. For example, when a 32×32-size transform unit is partitioned into four sub-transform units, each of the four sub-transform units may have a 16×16 size. When one transform unit is partitioned into four sub-transform units, the transform unit may be partitioned in the quad-tree form.

For example, when one transform unit is partitioned into two sub-transform units, a width size or a height size of one of the two sub-transform units may respectively be a half width size or a half height size of the original transform unit. For example, when a 32×32-size transform unit is vertically partitioned into two sub-transform units, each of the two sub-transform units may have a 16×32 size. For example, when a 32×32-size transform unit is horizontally partitioned into two sub-transform units, each of the two sub-transform units may have a 32×16 size. When one transform unit is partitioned into two sub-transform units, the transform unit may be partitioned in the binary-tree form.

When performing transform, the residual block may be transformed by using at least one of predetermined transform methods. For example, the predetermined transform methods may include discrete cosine transform (DCT), discrete sine transform (DST), KLT, etc. Which transform method is applied to transform the residual block may be determined by using at least one of inter-prediction mode information of the prediction unit, intra-prediction mode information of the prediction unit, and size/shape of the transform block. Information indicating the transform method may be signaled.

Figure 6:
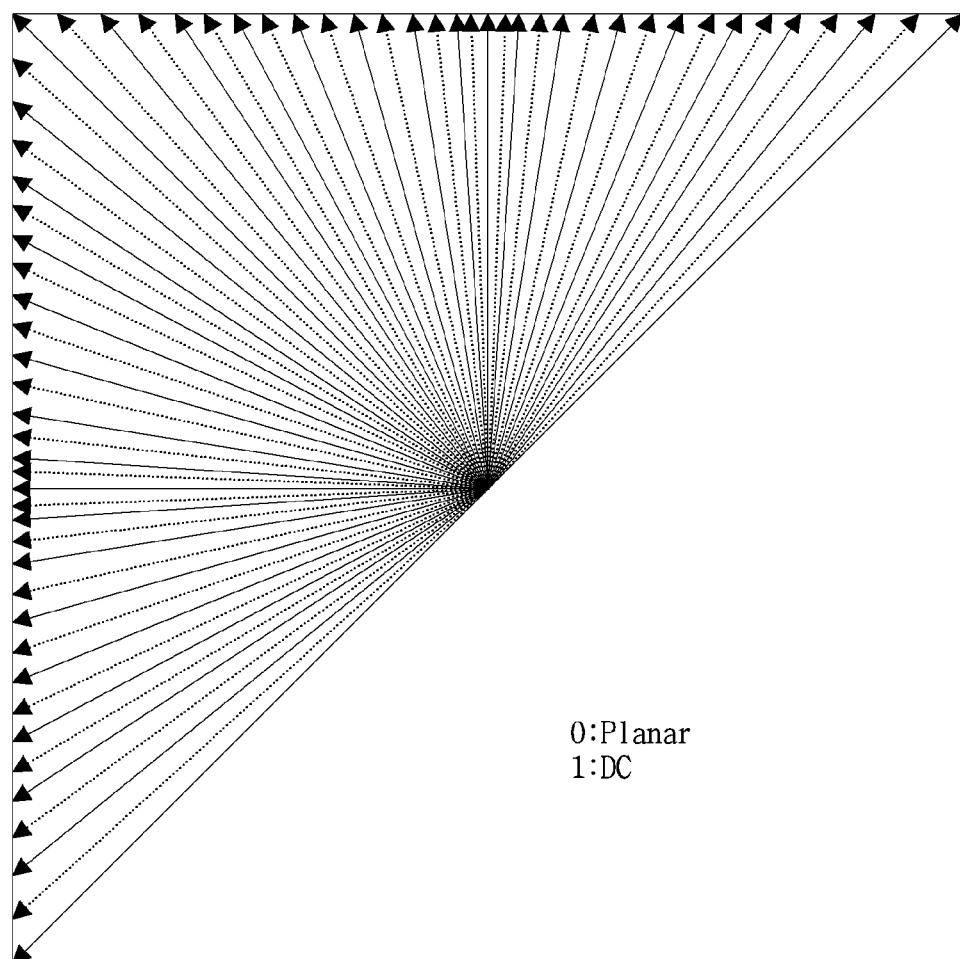
FIG. 6 is a view for explaining an embodiment of a process of intra prediction.

FIG. 6 is a view for explaining an embodiment of a process of intra prediction.

The intra-prediction mode may be a non-directional mode or a directional mode. The non-directional mode may be a DC mode or a planar mode. The directional mode may be a prediction mode having a particular direction or angle, and the number of directional modes may be M which is equal to or greater than one. The directional mode may be indicated as at least one of a mode number, a mode value, and a mode angle.

The number of intra-prediction modes may be N which is equal to or greater than one, including the non-directional and directional modes.

The number of intra-prediction modes may vary depending on the size of a block. For example, when the size is 4×4 or 8×8, the number may be 67, and when the size is 16×16, the number may be 35, and when the size is 32×32, the number may be 19, and when the size is 64×64, the number may be 7.

The number of intra-prediction modes may be fixed to N regardless of the size of a block. For example, the number may be fixed to at least one of 35 or 67 regardless of the size of a block.

The number of intra-prediction modes may vary depending on a type of a color component. For example, the number of prediction modes may vary depending on whether a color component is a luma signal or a chroma signal.

Intra encoding and/or decoding may be performed by using a sample value or an encoding parameter included in a reconstructed neighboring block.

For encoding/decoding a current block in intra prediction, whether or not samples included in a reconstructed neighboring block are available as reference samples of an encoding/decoding target block may be identified. When there are samples that cannot be used as reference samples of the encoding/decoding target block, sample values are copied and/or interpolated into the samples that cannot be used as the reference samples by using at least one of samples included in the reconstructed neighboring block, whereby the samples that cannot be used as reference samples can be used as the reference samples of the encoding/decoding target block.

In intra prediction, based on at least one of an intra-prediction mode and the size of the encoding/decoding target block, a filter may be applied to at least one of a reference sample or a prediction sample. Here, the encoding/decoding target block may mean a current block, and may mean at least one of a coding block, a prediction block, and a transform block. A type of a filter being applied to a reference sample or a prediction sample may vary depending on at least one of the intra-prediction mode or size/shape of the current block. The type of the filter may vary depending on at least one of the number of filter taps, a filter coefficient value, or filter strength.

In a non-directional planar mode among intra-prediction modes, when generating a prediction block of the encoding/decoding target block, a sample value in the prediction block may be generated by using a weighted sum of an upper reference sample of the current sample, a left reference sample of the current sample, an upper right reference sample of the current block, and a lower left reference sample of the current block according to the sample location.

In a non-directional DC mode among intra-prediction modes, when generating a prediction block of the encoding/decoding target block, it may be generated by an average value of upper reference samples of the current block and left reference samples of the current block. In addition, filtering may be performed on one or more upper rows and one or more left columns adjacent to the reference sample in the encoding/decoding block by using reference sample values.

In a case of multiple directional modes (angular mode) among intra-prediction modes, a prediction block may be generated by using the upper right and/or lower left reference sample, and the directional modes may have different direction. In order to generate a prediction sample value, interpolation of a real number unit may be performed.

In order to perform an intra-prediction method, an intra-prediction mode of a current prediction block may be predicted from an intra-prediction mode of a neighboring prediction block that is adjacent to the current prediction block. In a case of prediction the intra-prediction mode of the current prediction block by using mode information predicted from the neighboring intra-prediction mode, when the current prediction block and the neighboring prediction block have the same intra-prediction mode, information that the current prediction block and the neighboring prediction block have the same intra-prediction mode may be signaled by using predetermined flag information. When the intra-prediction mode of the current prediction block is different from the intra-prediction mode of the neighboring prediction block, intra-prediction mode information of the encoding/decoding target block may be encoded by performing entropy encoding.

FIG. 7 is a view for explaining an embodiment of a process of inter prediction.

The quadrangular shapes shown in FIG. 7 may indicate images (or, pictures). Also, the arrows of FIG. 7 may indicate prediction directions. That is, images may be encoded or decoded or both according to prediction directions. Each image may be classified into an I-picture (intra picture), a P-picture (uni-predictive picture), a B-picture (bi-predictive picture), etc. according to encoding types. Each picture may be encoded and decoded depending on an encoding type of each picture.

When an image, which is an encoding target, is an I-picture, the image itself may be intra encoded without inter prediction. When an image, which is an encoding target, is a P-picture, the image may be encoded by inter prediction or motion compensation using a reference picture only in a forward direction. When an image, which is an encoding target, is a B-picture, the image may be encoded by inter prediction or motion compensation using reference pictures in both a forward direction and a reverse direction. Alternatively, the image may be encoded by inter prediction or motion compensation using a reference picture in one of a forward direction and a reverse direction. Here, when an inter-prediction mode is used, the encoder may perform inter prediction or motion compensation, and the decoder may perform motion compensation in response to the encoder. Images of the P-picture and the B-picture that are encoded or decoded or both by using a reference picture may be regarded as an image for inter prediction.

Hereinafter, inter prediction according to an embodiment will be described in detail.

Inter prediction or motion compensation may be performed by using both a reference picture and motion information. In addition, inter prediction may use the above described skip mode.

The reference picture may be at least one of a previous picture and a subsequent picture of a current picture. Here, inter prediction may predict a block of the current picture depending on the reference picture. Here, the reference picture may mean an image used in predicting a block. Here, an area within the reference picture may be specified by using a reference picture index (refIdx) indicating a reference picture, a motion vector, etc.

Inter prediction may select a reference picture and a reference block relative to a current block within the reference picture. A prediction block of the current block may be generated by using the selected reference block. The current block may be a block that is a current encoding or decoding target among blocks of the current picture.

Motion information may be derived from a process of inter prediction by the encoding apparatus 100 and the decoding apparatus 200. In addition, the derived motion information may be used in performing inter prediction. Here, the encoding apparatus 100 and the decoding apparatus 200 may enhance encoding efficiency or decoding efficiency or both by using motion information of a reconstructed neighboring block or motion information of a collocated block (col block) or both. The col block may be a block relative to a spatial position of the encoding/ decoding target block within a collocated picture (col picture) that is previously reconstructed. The reconstructed neighboring block may be a block within a current picture, and a block that is previously reconstructed through encoding or decoding or both. In addition, the reconstructed block may be a block adjacent to the encoding/decoding target block or a block positioned at an outer corner of the encoding/decoding target block or both. Here, the block positioned at the outer corner of the encoding/decoding target block may be a block that is vertically adjacent to a neighboring block horizontally adjacent to the encoding/decoding target block. Alternatively, the block positioned at the outer corner of the encoding/decoding target block may be a block that is horizontally adjacent to a neighboring block vertically adjacent to the encoding/decoding target block.

The encoding apparatus 100 and the decoding apparatus 200 may respectively determine a block that exists at a position spatially relative to the encoding/decoding target block within the col picture, and may determine a predefined relative position on the basis of the determined block. The predefined relative position may be an inner position or an outer position or both of a block that exists at a position spatially relative to the encoding/decoding target block. In addition, the encoding apparatus 100 and the decoding apparatus 200 may respectively derive the col block on the basis of the determined predefined relative position. Here, the col picture may be one picture of at least one reference picture included in the reference picture list.

A method of deriving the motion information may vary according to a prediction mode of the encoding/decoding target block. For example, a prediction mode being applied for inter prediction may include an advanced motion vector prediction (AMVP), a merge mode, etc. Here, the merge mode may be referred to as a motion merge mode.

For example, when AMVP is applied as the prediction mode, the encoding apparatus 100 and the decoding apparatus 200 may respectively generate a motion vector candidate list by using a motion vector of the reconstructed neighboring block or a motion vector of the col block or both. The motion vector of the reconstructed neighboring block or the motion vector of the col block or both may be used as motion vector candidates. Here, the motion vector of the col block may be referred to as a temporal motion vector candidate, and the motion vector of the reconstructed neighboring block may be referred to as a spatial motion vector candidate.

The encoding apparatus 100 may generate a bitstream, and the bitstream may include a motion vector candidate index. That is, the encoding apparatus 100 may generate a bitstream by entropy encoding the motion vector candidate index. The motion vector candidate index may indicate an optimum motion vector candidate that is selected from motion vector candidates included in the motion vector candidate list. The motion vector candidate index may be signaled from the encoding apparatus 100 to the decoding apparatus 200 through the bitstream.

The decoding apparatus 200 may entropy decode the motion vector candidate index from the bitstream, and may select a motion vector candidate of a decoding target block among the motion vector candidates included in the motion vector candidate list by using the entropy decoded motion vector candidate index.

The encoding apparatus 100 may calculate a motion vector difference (MVD) between the motion vector and the motion vector candidate of the decoding target block, and may entropy encode the MVD. The bitstream may include the entropy encoded MVD. The MVD may be signaled from the encoding apparatus 100 to the decoding apparatus 200 through the bitstream. Here, the decoding apparatus 200 may entropy decode the received MVD from the bitstream. The decoding apparatus 200 may derive a motion vector of the decoding target block through a sum of the decoded MVD and the motion vector candidate.

The bitstream may include a reference picture index indicating a reference picture, etc., and a reference picture index may be entropy encoded and signaled from the encoding apparatus 100 to the decoding apparatus 200 through the bitstream. The decoding apparatus 200 may predict a motion vector of the decoding target block by using motion information of neighboring blocks, and may derive the motion vector of the decoding target block by using the predicted motion vector and the motion vector difference. The decoding apparatus 200 may generate the prediction block of the decoding target block on the basis of the derived motion vector and reference picture index information.

As another method of deriving the motion information, a merge mode is used. The merge mode may mean a merger of motions of a plurality of blocks. The merge mode may mean application of motion information of one block to another block. When the merge mode is applied, the encoding apparatus 100 and the decoding apparatus 200 may respectively generate a merge candidate list by using motion information of the reconstructed neighboring block or motion information of the col block or both. The motion information may include at least one of 1) the motion vector, 2) the reference picture index, and 3) the inter-prediction indicator. A prediction indicator may indicate a uni-direction (L0 prediction, L1 prediction) or a bi-direction.

Here, the merge mode may be applied to each CU or each PU. When the merge mode is performed at each CU or each PU, the encoding apparatus 100 may generate a bitstream by entropy decoding predefined information, and may signal the bitstream to the decoding apparatus 200. The bitstream may include the predefined information. The predefined information may include: 1) a merge flag that is information indicating whether or not the merge mode is performed for each block partition; and 2) a merge index that is information to which a block among the neighboring blocks adjacent to the encoding target block is merged. For example, neighboring blocks adjacent to the encoding target block may include a left neighboring block of the encoding target block, an upper neighboring block of the encoding target block, a temporally neighboring block of the encoding target block, etc.

The merge candidate list may indicate a list storing motion information. In addition, the merge candidate list may be generated in advance of performing the merge mode. The motion information stored in the merge candidate list may be at least one of motion information of the neighboring block adjacent to the encoding/decoding target block, motion information of the collocated block relative to the encoding/decoding target block in the reference picture, motion information newly generated by a combination of motion information that exists in the merge motion candidate list in advance, and a zero merge candidate. Here, motion information of the neighboring block adjacent to the encoding/decoding target block may be referred to as a spatial merge candidate. Motion information of the collocated block relative to the encoding/decoding target block in the reference picture may be referred to as a temporal merge candidate.

A skip mode may be a mode applying the mode information of the neighboring block itself to the encoding/ decoding target block. The skip mode may be one of modes used for inter prediction. When the skip mode is used, the encoding apparatus 100 may entropy encode information about motion information of which block is used as motion information of the encoding target block, and may signal the information to the decoding apparatus 200 through a bitstream. The encoding apparatus 100 may not signal other information, for example, syntax element information, to the decoding apparatus 200. The syntax element information may include at least one of motion vector difference information, a coded block flag, and a transform coefficient level.

A residual signal generated after intra or inter prediction may be transformed into a frequency domain through a transform process as a part of a quantization process. Here, a primary transform may use DCT type 2 (DCT-II) as well as various DCT, DST kernels. On a residual signal, these transform kernels may perform a separable transform performing a 1D transform in a horizontal and/or vertical direction, or may perform a 2D non-separable transform.

For example, DCT and DST types used in transform may use DCT-II, DCT-V, DCT-VIII, DST-I, and DST-VII as shown in following tables in a case of the 1D transform. For example, as shown in the table 1 and table 2, a DCT or DST type used in transform by composing a transform set may be derived.

TABLE 1

| Transform set | Transform |
| --- | --- |
| 0 | DST_VII, DCT-VIII |
| 1 | DST-VII, DST-I |
| 2 | DST-VII, DCT-V |

TABLE 2

| Transform set | Transform |
| --- | --- |
| 0 | DST_VII, DCT-VIII, DST-I |
| 1 | DST-VII, DST-I, DCT-VIII |
| 2 | DST-VII, DCT-V, DST-I |

For example, as shown in FIG. 8, according to an intra-prediction mode, different transform sets are defined for horizontal and vertical directions. Next, the encoder/decoder may perform transform and/or inverse transform by using an intra-prediction mode of a current encoding/decoding target block and transform of a relevant transform set. In this case, entropy encoding/decoding is not performed on the transform set, and the encoder/decoder may define the transform set according to the same rule. In this case, entropy encoding/decoding indicating which transform is used among transforms of the transform set may be performed. For example, when the size of a block is equal to or less than 64×64, three transform sets are composed as shown in table 2 according to an intra-prediction mode, and three transforms are used for each horizontal direction transform and vertical direction transform to combine and perform total nine multi-transform methods. Next, a residual signal is encoded/decoded by using the optimum transform method, whereby encoding efficiency can be enhanced. Here, in order to perform entropy encoding/decoding on information about which transform method is used among three transforms of one transform set, truncated unary binarization may be used. Here, for at least one of vertical transform and horizontal transform, entropy encoding/decoding may be performed on the information indicating which transform is used among transforms of a transform set.

Figure 9:
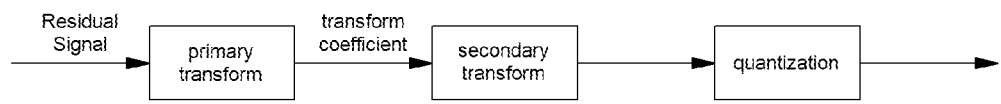
FIG. 9 is a view for explaining a process of transform.

After completing the above-described primary transform, the encoder may perform a secondary transform to increase energy concentration for transformed coefficients as shown in FIG. 9. The secondary transform may perform a separable transform performing a 1D transform in a horizontal and/or vertical direction, or may perform a 2D non-separable transform. Used transform information may be signaled or may be derived by the encoder/decoder according to current and neighboring encoding information. For example, like the 1D transform, a transform set for the secondary transform may be defined. Entropy encoding/decoding is not performed on the transform set, and the encoder/decoder may define the transform set according to the same rule. In this case, information indicating which transform is used among transforms of the transform set may be signaled, and the information may be applied to at least one residual signal through intra or inter prediction.

At least one of the number or types of transform candidates is different for each transform set. At least one of the number or types of transform candidates may be variably determined based on at least one of the location, the size, the partition form, and the prediction mode (intra/inter mode) or direction/non-direction of the intra-prediction mode of a block (CU, PU, TU, etc.).

The decoder may perform a secondary inverse transform depending on whether or not the secondary inverse transform is performed, and may perform a primary inverse transform depending on whether or not the primary inverse transform is performed from the result of the secondary inverse transform.

The above-described primary transform and secondary transform may be applied to at least one signal component of luma/chroma components or may be applied according to the size/shape of an arbitrary coding block. Entropy encoding/decoding may be performed on an index indicating both whether or not the primary transform/secondary transform is used and the used primary transform/secondary transform in an arbitrary coding block. Alternatively, the index may be tacitly derived by the encoder/decoder according to at least one piece of current/neighboring encoding information.

The residual signal generated after intra or inter prediction goes through a quantization process after the primary and/or secondary transform, and quantized transform coefficients go through an entropy encoding process. Here, the quantized transform coefficients may be scanned in diagonal, vertical, and horizontal directions based on at least one of the intra-prediction mode or the size/shape of a minimum block as shown in FIG. 10.

In addition, the quantized transform coefficients on which entropy decoding is performed may be arranged in block forms by being inverse scanned, and at least one of dequantization or inverse transform may be performed on the relevant block. Here, as a method of inverse scanning, at least one of diagonal direction scanning, horizontal direction scanning, and vertical direction scanning may be performed.

Figure 10:
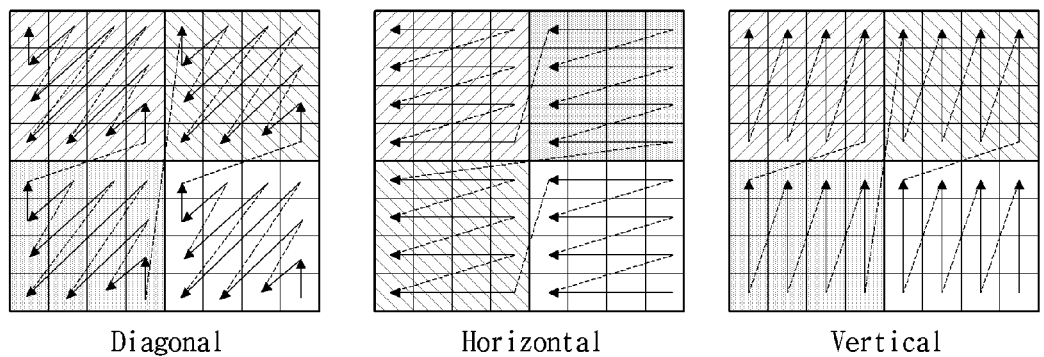
FIG. 10 is a view for explaining scanning of quantized transform coefficients.

For example, when the size of a current coding block is 8×8, primary transform, secondary transform, and quantization may be performed on a residual signal for the 8×8 block, and next, scanning and entropy encoding may be performed on quantized transform coefficients for each of four 4×4 sub-blocks according to at least one of three scanning order methods shown in FIG. 10. In addition, inverse scanning may be performed on the quantized transform coefficients by performing entropy decoding. The quantized transform coefficients on which inverse scanning is performed become transform coefficients after dequantization, and at least one of secondary inverse transform or primary inverse transform is performed, whereby a reconstructed residual signal can be generated.

Figure 11:
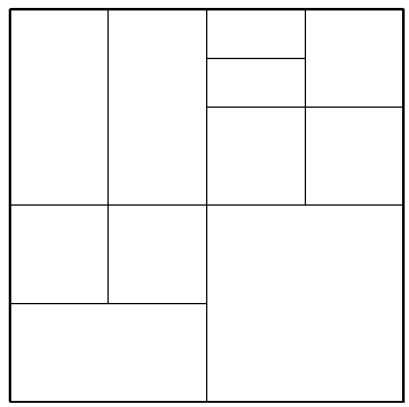
FIG. 11 is a view for explaining block partition.

In a video encoding process, one block may be partitioned as shown in FIG. 11, and an indicator corresponding to partition information may be signaled. Here, the partition information may be at least one of a partition flag (split_flag), a quad/binary tree flag (QB_flag), a quad tree partition flag (quadtree_flag), a binary tree partition flag (binarytree_flag), and a binary tree partition type flag (Btype_flag). Here, split_flag is a flag indicating whether or not a block is partitioned, QB_flag is a flag indicating whether a block is partitioned in a quad tree form or in a binary tree form, quadtree_flag is a flag indicating whether or not a block is partitioned in a quad tree form, binarytree_flag is a flag indicating whether or not a block is partitioned in a binary tree form, Btype_flag is a flag indicating whether a block is vertically or horizontally partitioned in a case of partition of a binary tree form.

When the partition flag is 1, it may indicate partitioning is performed, and when the partition flag is 0, it may indicate partitioning is not performed. In a case of the quad/binary tree flag, 0 may indicate a quad tree partition, and 1 may indicate a binary tree partition. Alternatively, 0 may indicate a binary tree partition, and 1 may indicate a quad tree partition. In a case of the binary tree partition type flag, 0 may indicate a horizontal direction partition, and 1 may indicate a vertical direction partition. Alternatively, 0 may indicate a vertical direction partition, and 1 may indicate a horizontal direction partition.

For example, partition information for FIG. 11 may be derived by signaling at least one of quadtree_flag, binarytree_flag, and Btype_flag as shown in table 3.

signaled by a unit of at least one of a sequence, a picture parameter, or a slice (segment). Alternatively, the size of a maximum/minimum block may be a fixed size that is preset in the encoder/decoder. For example, when the size of a block ranges 256×256 to 64×64, partitioning may be performed only in a quad tree form. In this case, the split_flag may be a flag indicating whether partitioning is performed in a quad tree form.

When the size of a block is in a predetermined range, partitioning may be performed only in a binary tree form. Here, the predetermined range may be defined as at least one of the size of a maximum block or the size of a minimum block that can be partitioned only in a binary tree form. Information indicating the size of a maximum/minimum block where a partition in the binary tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 16×16 to 8×8, partitioning may be performed only in a binary tree form. In this case, the split_flag may be a flag indicating whether partitioning is performed in a binary tree form.

After partitioning one block in a binary tree form, when the partitioned block is further partitioned, partitioning may be performed only in a binary tree form.

When the width or length size of the partitioned block cannot be further partitioned, at least one indicator may not be signaled.

Besides the quad tree based binary tree partitioning, the quad tree based partitioning may be performed after the binary tree partitioning.

TABLE 3

| quadtree_flag | 1 | 0 |   |   | 1 | 0 |   |   | 0 | 0 | 0 | 0 |   |   |   |   | 0 |
|---|---|---|---|---|---|---|---|---|---|---|---|---|---|---|---|---|---|
| binarytree_flag |   | 1 | 0 | 0 |   | 1 | 0 | 0 | 0 | 0 | 0 | 1 | 1 | 0 | 0 | 0 | 0 |
| Btype_flag |   |   | 1 |   |   |   | 0 |   |   |   |   |   |   | 0 | 1 |   |   |

For example, partition information for FIG. 11 may be derived by signaling at least one of split_flag, QB_flag, and Btype_flag as shown in table 2.

TABLE 4

| split_flag | 1 | 1 |   |   | 0 | 0 | 1 |   | 1 |   | 0 | 0 | 0 | 0 | 0 | 1 |   | 1 |   | 0 | 0 | 0 | 0 |
|---|---|---|---|---|---|---|---|---|---|---|---|---|---|---|---|---|---|---|---|---|---|---|---|
| QB_flag |   | 0 | 1 |   |   |   | 0 |   | 1 |   |   |   |   |   |   | 1 |   |   | 0 | 1 |   |   |   |
| Btype_flag |   |   |   | 1 |   |   |   |   |   | 0 |   |   |   |   |   |   | 0 |   | 1 |   |   |   |   |

The partition method may be performed only in a quad tree form or only in a binary tree form according to the size/shape of a block. In this case, the split_flag may mean a flag indicating whether partitioning is performed in a quad tree for or in a binary tree form. The size/shape of a block may be derived according to depth information of a block, and the depth information may be signaled.

When the size of a block is in a predetermined range, partitioning may be performed only in a quad tree form. Here, the predetermined range may be defined as at least one of the size of a maximum block or the size of a minimum block that can be partitioned only in a quad tree form. Information indicating the size of a maximum/minimum block where a partition in the quad tree form is allowed may be signaled through a bitstream, and the information may be FIG. 12 is a view showing an operation of an encoding apparatus performing an intra prediction method according to the present invention.

Figure 12:
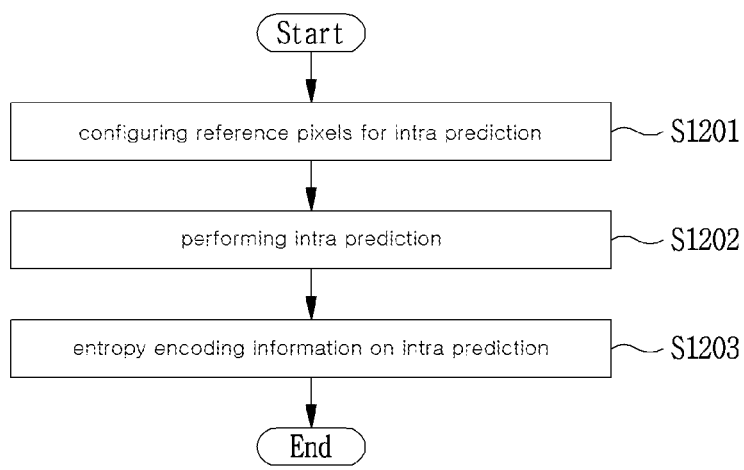
FIG. 12 is a view showing an operation of an encoding apparatus performing an intra prediction method according to the present invention.

In step S1201 of FIG. 12, a reference pixel for intra prediction may be configured. Then, in step S1202, intra prediction may be performed, and in step S1203, information on intra prediction may be encoded.

Figure 13:
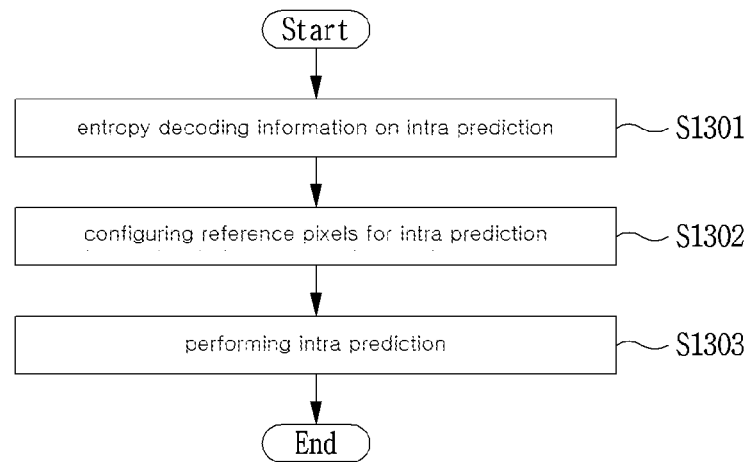
FIG. 13 is a view showing an operation of a decoding apparatus performing an intra prediction method according to the present invention.

FIG. 13 is a view showing an operation of a decoding apparatus performing an intra prediction method according to the present invention.

In step S1301 of FIG. 13, information on intra prediction may be decoded. Then, in step S1302, a reference pixel for intra prediction may be configured, and in step S1303, intra prediction may be performed.

First, steps of configuring the reference pixel for intra prediction will be described in detail with reference to FIGS. 14 to 17 (steps S1201 and S1302).

Figure 14:
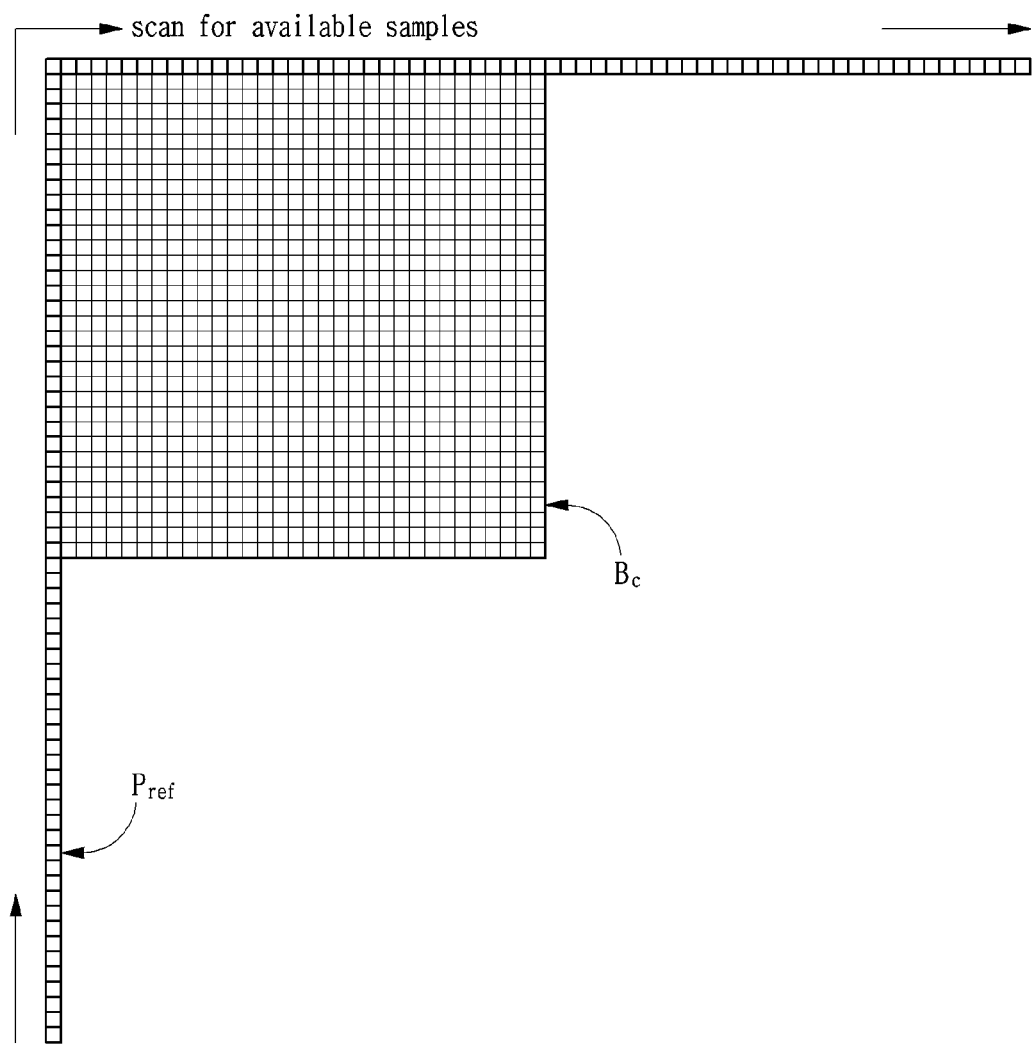
FIG. 14 is a view showing a pixel that may be used for configuring a reference pixel array $p_{ref}$ for intra prediction.

FIG. 14 is a view showing a pixel that may be used for configuring a reference pixel array $p_{ref}$ for intra prediction.

As shown in FIG. 14, a reference pixel for intra prediction of a current block $B_c$ that is an encoding/decoding target block may be configured by using pixels within neighboring blocks that have been already encoded/decoded. For example, a referenced neighboring block may be a block positioned at an upper side and/or a left side of the current block, but it is not limited thereto, the referenced neighboring block may be a block included in the same picture in which the current block included. When a size of the current block is N×M, a number of reference pixels may be a positive integer including (2×N+2×M+1).

In order to configure reference pixels, availability checking for pixels of the neighboring block may be performed. Availability checking for the pixels of the neighboring block may be performed in a predetermined direction. For example, for availability checking, scanning may be performed in a direction from a left lowermost side pixel to a right uppermost side pixel. Alternatively, scanning may be performed in the opposite direction. Alternatively, scanning may be respectively performed in different directions with respect to a left neighboring side pixel and an upper neighboring side pixel.

For example, when a reference pixel candidate of the current block is positioned outside of the picture, the corresponding reference pixel candidate may be designated as "marked as not available".

For example, when a reference pixel candidate of the current block belongs to other slice, the corresponding reference pixel candidate may be designated as "marked as not available".

For example, when a reference pixel candidate of the current block belongs to a neighboring block that has been already encoded/decoded by inter prediction or constrained intra prediction, the corresponding reference pixel candidate may be designated as "marked as not available".

Reference pixel candidates designated as "marked as not available" (hereinafter, referred as 'non-available reference pixel candidate' or 'non-available reference pixel') may be replaced by using an available reference pixel.

Figures 15, 16:
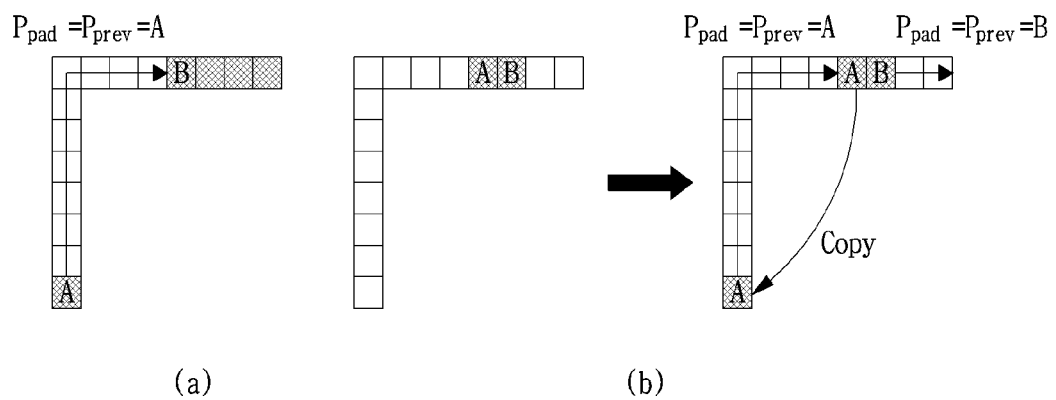
FIG. 15 is a view showing an embodiment of replacing a "non-available reference pixel candidate" to a pixel value of an "available reference pixel candidate".
FIG. 16 is a view exemplary showing a threshold value ntraHorVerDistThresh assigned to a block size $N_s$.

FIG. 15 is a view showing an embodiment of replacing a "non-available reference pixel candidate" to a pixel value of an "available reference pixel candidate".

In FIG. 15, graded pixels indicate available reference pixels and blanked pixels indicate non-available reference pixels. In FIG. 15, availability checking may be performed in a direction from a left lowermost side pixel to an upper rightmost side pixel.

FIG. 15(a) is a view showing an embodiment of replacing non-available reference pixels when the non-available reference pixels are present in the middle of a reference pixel array $p_{ref}$, in other words, in the middle of available reference pixels A and B.

In FIG. 15(a), a non-available reference pixel may be replaced by padding a value of the reference pixel A that is adjacent to a first non-available reference pixel among available reference pixels of the reference pixel array ($P_{pad}=P_{prev}=A$). $P_{pad}$ refers to a padded pixel value, and $P_{prev}$ refers to a previous adjacent available reference pixel.

Alternatively, in FIG. 15(a), a non-available reference pixel may be replaced with a pixel value that is derived by using at least two available reference pixels. For example, available reference pixels positioned at both ends of the non-available reference pixel may be used. For example, in FIG. 15(a), values of non-available reference pixels may be replaced by using pixel values of the available reference pixels A and B. For example, non-available reference pixels may be replaced by using an average value or a weighted sum of pixel values of available reference pixels A and B. In the present specification, a weighted sum may be used as including a weighted average.

Alternatively, a value of a non-available reference pixel may be replaced with an arbitrary value between pixel values of the available reference pixels A and B. Herein, non-available reference pixels may be replaced with values different from each other. For example, the closer the non-available reference pixel is to the reference pixel A, the more likely the non-available reference pixel may be replaced with a pixel value that is close to a pixel value of the pixel A. Similarly, the closer the non-available reference pixel is to the reference pixel B, the more likely the non-available reference pixel may be replaced with a pixel value that is close to a pixel value of the pixel B. In other words, based on a distance from a non-available reference pixel to the available reference pixel A and/or the available reference pixel B, a pixel value of a non-available reference pixel may be determined.

At least one of a plurality methods including the above methods may be selectively applied to replace a non-available reference pixel. A method of replacing a non-available reference pixel may be signaled in information included in a bitstream, or a method that is predetermined by an encoder and a decoder may be used. Alternatively, a method of replacing a non-available reference pixel may be derived by a predetermined method. For example, based on a difference between pixel values of the available reference pixels A and B and/or a number of non-available reference pixels, a method of replacing a non-available reference pixel may be selected. For example, a method replacing a non-available reference pixel may be selected based on comparing a difference between pixel values of two available reference pixels to a threshold value, and/or comparing a number of non-available reference pixels to a threshold value. For example, when the difference between pixel values of two available reference pixels is larger than the threshold value, and/or the number of non-available reference pixels is larger than the threshold value, the non-available reference pixel may be replaced to have values different from each other.

A selection of a method of replacing a non-available reference pixel may be performed in a predetermined unit. For example, the selection of the method of replacing the non-available reference pixel may be performed by a unit of at least one of a video, a sequence, a picture, a slice, a tile, a coding tree unit, a coding unit, a prediction unit and a transform unit. Herein, the selection of the method of replacing the non-available reference pixel may be based on information signaled in the above predetermined unit, or may be derived by the above predetermined unit. Alternatively, a method that is predetermined by an encoder and a decoder may be applied thereto.

FIG. 15(b) is a view showing an embodiment of replacing a non-available reference pixel when an available reference pixel is not present in front of the non-available reference pixel in the reference pixel array $p_{ref}$.

In FIG. 15(b), a non-available reference pixel may be replaced by padding a pixel value of an available reference pixel A adjacent to the last non-available reference pixel. For example, in FIG. 15(b), a first non-available reference pixel of the reference pixel array may be replaced with a pixel value of the pixel A that is a first available reference pixel within a scanning sequence. After determining a pixel value of the first non-available reference pixel of the reference pixel array, the method described with reference to FIG. 15(a) may be applied thereto. Accordingly, non-available reference pixels positioned from the first non-available reference pixel within the scanning sequence to the immediately previous pixel of the first available reference pixel A may be replaced with a pixel value of the reference pixel A ($P_{pad}=P_{prev}=A$). In addition, non-available reference pixels positioned successive to the available reference pixel B may be replaced with a pixel value of reference pixel B ($P_{pad}=P_{prev}=B$).

As a case not shown in FIG. 15, for example, when no available reference pixel is present in the reference pixel array $p_{ref}$, all of non-available reference pixels may be replaced with arbitrary values. Herein, as the arbitrary values, a middle value of a pixel value range referring to a range that a reference pixel may have (for example, in case of an image having 8-bit as a bit depth $B_d$, $2^{Bd-1}=128$, $B_d=8$) may be used. Alternatively, a positive integer value between 0 and 2B may be used as the arbitrary values.

Before performing intra prediction using a reference pixel, filtering for reference pixels may be performed.

After generating the reference pixel array $p_{ref}$ from the neighboring blocks which have been already encoded/decoded, filtering for reference pixels may be performed based on a size $N_s$ of the current block and/or an intra prediction mode. For example, when the intra prediction mode of the current block is a directional prediction mode, filtering may be performed based on a difference between a vertical directional mode and/or a horizontal directional mode. For example, when the intra prediction mode intraPredMode of the current block is a directional prediction mode, among a difference value with vertical directional modes (assuming 33 directional modes, index=26) and a difference value with horizontal directional modes (assuming 33 directional modes, index=10), a smaller value of the two values may be calculated, minDistVerHor=Min(Abs(intraPredMode−26), abs(intraPredMode−10)). When the above smaller value minDistVerHor is greater than a threshold value intraHorVerDistThresh that is assigned to a corresponding block size, that is, minDistVerHor >intraHorVerDistThresh, filtering may be performed. When the above smaller value minDistVerHor is equal to or smaller than the threshold value, filtering may not be performed.

FIG. 16 is a view exemplary showing a threshold value ntraHorVerDistThresh assigned to a block size $N_s$.

For example, for a 4×4 block, 10 may be assigned as a threshold value, for a 8×8 block, 7 may be assigned as the threshold value, for a 16×16 block, 1 may be assigned as the threshold value, for a 32×32 block, 0 may be assigned as the threshold value, and for a 64×64 block, 10 may be assigned as the threshold value. The threshold values of FIG. 16 are examples, and depending on a block size, arbitrary threshold values that are identical or different from each other may be set as the threshold values. The threshold value depending on the block size may be a value that is predetermined by an encoder and a decoder. Alternatively, the threshold value may be a value that is derived based on information signaled through a bitstream and/or based on an internal parameter used when encoding/decoding.

Figure 17:
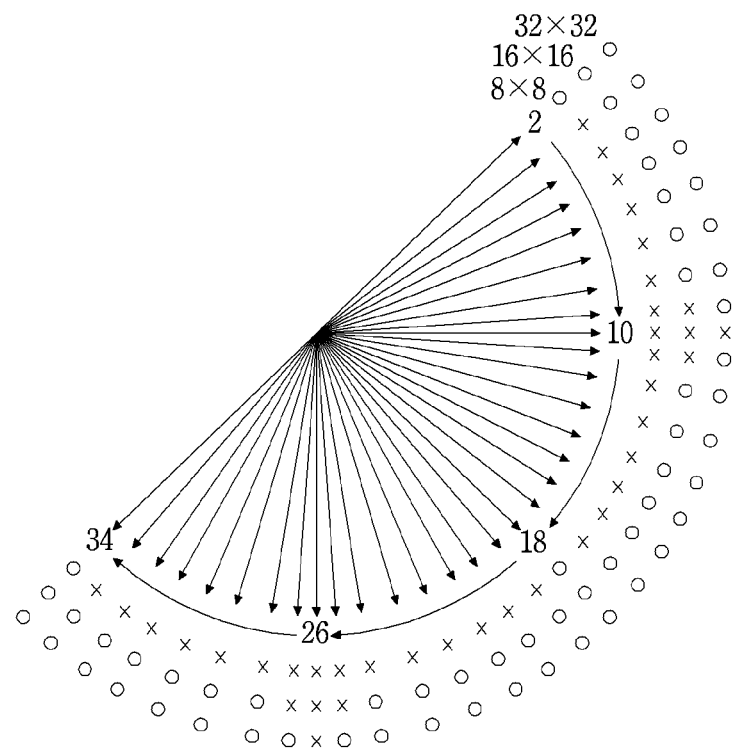
FIG. 17 is a view showing whether or not to perform filtering for reference pixels according to a block size and a directional prediction mode of a current block.

FIG. 17 is a view showing whether or not to perform filtering for reference pixels according to a block size and a directional prediction mode of a current block.

As shown in FIG. 17, for the current block having a block size of 8×8, 16×16, or 32×32, whether to perform filtering for reference pixels may be determined according to a directional prediction mode. X marks mean that filtering is not performed, and ○ marks mean that filtering is performed.

According to a scanning sequence described with reference to FIGS. 14 and 15, filtering may be sequentially performed in an order from a left lowermost side pixel to an upper rightmost side pixel of $p_{ref}$. Alternatively, filtering for the $p_{ref}$ may be performed in an arbitrary order. Herein, filtering for the first reference pixel (a left lowermost side pixel) and the last reference pixel (an upper rightmost side pixel) may be skipped. A size of a filter tap may be a positive integer lager than 2 and including 3. When the size of the filter tap is 3, filter coefficients may be, for example, ¼, ½, and ¼. Filtering may be performed by using N reference pixels. The N reference pixels may include a filtered reference pixel or a reference pixel before being filtered. For example, a weighted sum (or a weighted average) of N reference pixels may be replaced with a pixel value of a filtering target pixel. Herein, the size of the filter tab may be determined based on a number N, and the filter coefficient may be a weight used for the weighted sum. The weight may be determined based on positions of the filtering target pixel and a reference pixel used for filtering. For example, the closer the filtering target pixel comes to the reference pixel used for filtering, the larger the weight may be applied.

As another embodiment to which filtering is applied, bi-linear interpolation filtering may be performed for a current block having a block size equal to or greater than a predetermined size. For example, for a current block having a block size equal to or larger than a predetermined size $N_s$, a secondary differential value of a vertical direction and/or a horizontal direction may be calculated. For example, a secondary differential value of a vertical direction may be calculated as $|p_{ref}(-1, -1)-2\times p_{ref}(-1, N_s/2)+p_{ref}(-1, N_s)|$. For example, a secondary differential value of a horizontal direction may be calculated as $|p_{ref}(-1, -1)-2\times p_{ref}(N_s/2, -1)+p_{ref}(N_s, -1)|$). The calculated secondary differential values may be compared to respective predetermined threshold values. The respective predetermined threshold values may be determined based on a bit depth $B_d$. For example, the predetermined threshold value may be $2^{Bd-C}$. Herein, C may be an arbitrary integer between 1 and $B_d$. Filtering may be performed based on comparisons results between the calculated secondary differential values to the respective predetermined threshold values.

For example, when the below Formula 1 is satisfied, filtering may be performed.

$$|p_{ref}(-1,-1)-2\times p_{ref}(N_s-1,-1)+p_{ref}(2\times N_s-1,-1)|<2^{Bd-C}$$

and/or $$|p_{ref}(-1,-1)-2\times p_{ref}(-1,N_s-1)+p_{ref}(-1,2\times N_s-1)|<2^{Bd-C} \quad \text{[Formula 1]}$$

($B_d$ is a bit-depth, $1<=C<=$positive integer of $B_d$)

When the above Formula 1 is satisfied, a pixel value of a filtering target pixel may be calculated by performing bi-linear interpolation using two reference pixels. Two pixels used for bi-linear interpolation may be, for example, reference pixels positioned at both ends of a reference pixel array in a vertical direction or in a horizontal direction. An interpolation coefficient used for bi-linear interpolation may be determined, for example, based on positions of the two reference pixels and the filtering target pixel. Filtering using bi-linear interpolation may be performed, for example, by using the Formula 2 below.

$$p_{ref}(-1,y)=(N_s-1-y)/N_s \times p_{ref}(-1,-1)+(y+1)/N_s \times p_{ref}(-1, N_s-1),$$

for y=0, . . . , $N_s$–1, and/or $$p_{ref}(x,-1)=(N_s-1-x)/N_s \times p_{ref}(-1,-1)+(x+1)/N_s \times p_{ref}(N_s-1,-1),$$ [Formula 2]

for x=0, . . . , $N_s$–1

As described above, when the reference pixels for intra prediction are configured in steps S1201 and S1302, intra prediction may be performed using the reference pixels in steps S1202 and S1303.

In order to perform intra prediction for the current block, an intra prediction mode has to be determined. An encoding apparatus may perform intra prediction by selecting a single intra prediction mode among a plurality of intra prediction modes. A decoding apparatus may perform intra prediction by decoding an intra prediction mode of a current block from information signaled from the encoder. The decoding of the intra prediction mode may be derived by decoding information on intra prediction, and the above process will be described later with a description of step S1301.

Hereinbelow, steps S1202 and S1303 of performing intra prediction using the reference pixels will be described in detail with reference to FIGS. 18 to 43.

Figure 18:
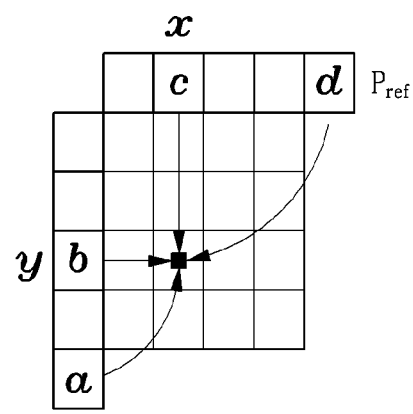
FIG. 18 is a view showing intra prediction when an intra prediction mode is a non-directional planar mode INTRA_PLANAR.

FIG. 18 is a view showing intra prediction when an intra prediction mode is a non-directional planar mode INTRA_PLANAR.

When the intra prediction mode is a non-directional planar mode INTRA_PLANAR, a prediction block may be calculated by a weighted sum or a weighted average of N reference pixels. The N reference pixels may be determined depending on a position (x, y) of a prediction target pixel within the prediction block. N may be a positive integer greater than 1, for example, 4.

As shown in FIG. 18, when N=4 and a block size $N_s$ is 4, a prediction value of a pixel positioning at (x, y) within the prediction block may be determined by a weighted sum of an upper side reference pixel c, a left side reference pixel b, a right upper side corner pixel d of the current block, and a left lower side corner pixel a of the current block. When calculating the weighted sum, the below Formula 3 may be used.

$$B_C(x, y) = \frac{y+1}{2*N_S} p_{ref}(-1, N_S) + \frac{N_S-1-x}{2*N_S} p_{ref}(-1, y) + \frac{N_S-1-y}{2*N_S} p_{ref}(x, -1) + \frac{x+1}{2*N_S} p_{ref}(N_S-1)$$ [Formula 3]

Figure 19:
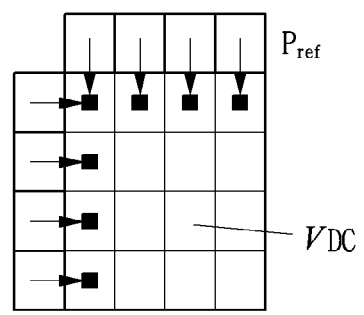
FIG. 19 is a view showing intra prediction when an intra prediction mode is a non-directional DC mode INTRA_DC.

FIG. 19 is a view showing intra prediction when an intra prediction mode is a non-directional DC mode INTRA_DC.

When the intra prediction mode is a non-directional DC mode INTRA_DC, all pixel values within a prediction block may be filled with an average value of pixel values of reference pixels adjacent to a current block. When calculating the average value, the below Formula 4 may be used.

$$v_{DC} = \frac{1}{2 \times N_S} \left( \sum_{x=0}^{N_S-1} p_{ref}(x, -1) + \sum_{y=0}^{N_S-1} p_{ref}(-1, y) \right)$$ [Formula 4]

In DC mode, filtering may be performed for N rows/columns of a left side and/or an upper side of the current block, and N may be an integer equal to or greater than 1. For example, when N=1, as shown in FIG. 19, filtering may be performed for a first row of an upper side of the current block and/or a first column of a left size. Filtering may be performed, for example, by using the Formula 5 below.

$$B_C(0,0)=\frac{1}{4}[p_{ref}(-1,0)+p_{ref}(0,-1)+2*v_{DC}]$$

$$B_C(x,0)=\frac{1}{4}[p_{ref}(x,-1)+3*v_{DC}]$$

$$B_C(0,y)=\frac{1}{4}[p_{ref}(-1,y)+3*v_{DC}]$$ [Formula 5]

In DC mode, a final prediction block may be obtained by obtaining a first prediction block by using a $V_{dc}$ value, and by applying filtering to N rows and/or columns of the first prediction block. Alternatively, after calculating the $V_{dc}$ value, the final prediction block may be directly obtained by assigning the $V_{dc}$ value to a filtered value or by assigning the $V_{dc}$ value to a pixel value of a corresponding pixel, based on a position of a target pixel within the prediction block.

When the intra prediction mode is a directional mode, the current block may be encoded/decoded based on N straight-directional modes. N may be a positive integer including 33, 65, etc. For example, in FIG. 17, N is 33 (from a mode 2 to a mode 34), each mode has a different direction.

FIG. 20 is a view showing an embodiment of angles between each straight-directional mode and a vertical direction among intra prediction modes predModeIntra including 33 straight-directional modes.

In addition to a straight-directional mode, a current block may be encoded/decoded based on M curved modes (M is a positive integer). A number M of curved modes may be determined by using parameters. As parameters, for example, a curvature parameter cuv and/or a weight parameter cw may be used.

As exemplified in FIG. 20, a mode 35 may refer to a curved mode from a right upper side to a left lower side direction, a mode 36 may refer to a curved mode from a left upper side to a right lower side (type-1) direction, a mode 37 may refer to a curved mode from a left lower side to a right upper side direction, a mode 38 may refer to a curved mode from a left upper side to a right lower side (type-2) direction, a mode 39 may refer to a curved mode from an upper side to a left lower side direction, a mode 40 may refer to a curved mode from an upper side to a left upper side direction, a mode 41 may refer to a curved mode from a left side to a right upper side direction, and a mode 42 may refer to a curved mode from a left side to a right lower side direction.

For respective curved modes of FIG. 20, various curved predictions may be performed based on the curvature parameter and/or the weight parameter.

The curvature parameter and/or the weight parameter which is used as a parameter for performing curved prediction is merely an example and various parameters may be used for generating a curved prediction block. For example, for block sizes different from each other, look-up-tables specifying angles for searching a position of a reference pixel for curved prediction at each position of a pixel may be equally used in an encoder/decoder.

Figure 21:
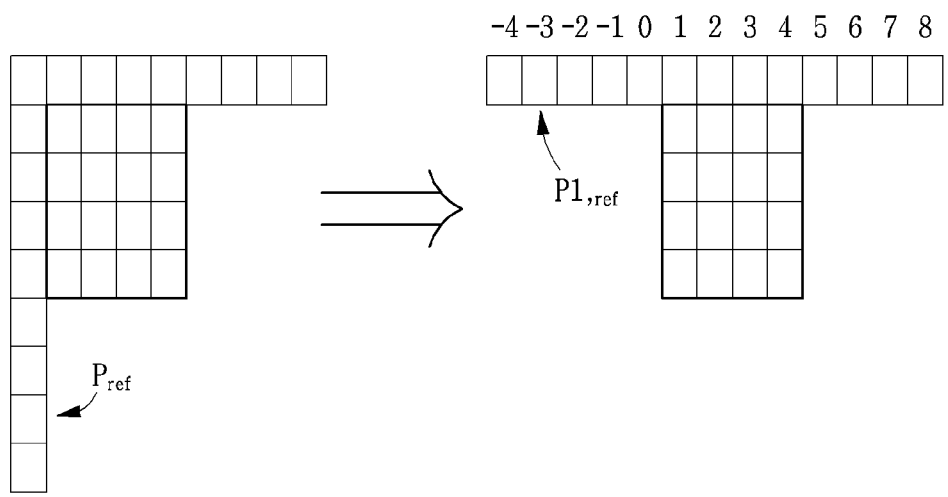
FIG. 21 is a view illustrating an example of generating a one-dimensional reference pixel array $p_{1,ref}$ from $p_{ref}$.

For intra straight-directional prediction, a left side reference pixel and/or an upper side reference pixel which is used for prediction may be differently determined according to a direction of a prediction mode. In addition, for convenience of calculation, before performing prediction, as shown in FIG. 21, a one-dimensional (1-D) reference pixel array $p_{1,ref}$ may be generated from $p_{ref}$. A number of reference pixels mapped as $p_{1,ref}$ may be differently determined according to an angle $P_{ang}$ of a directional prediction mode.

Figure 22:
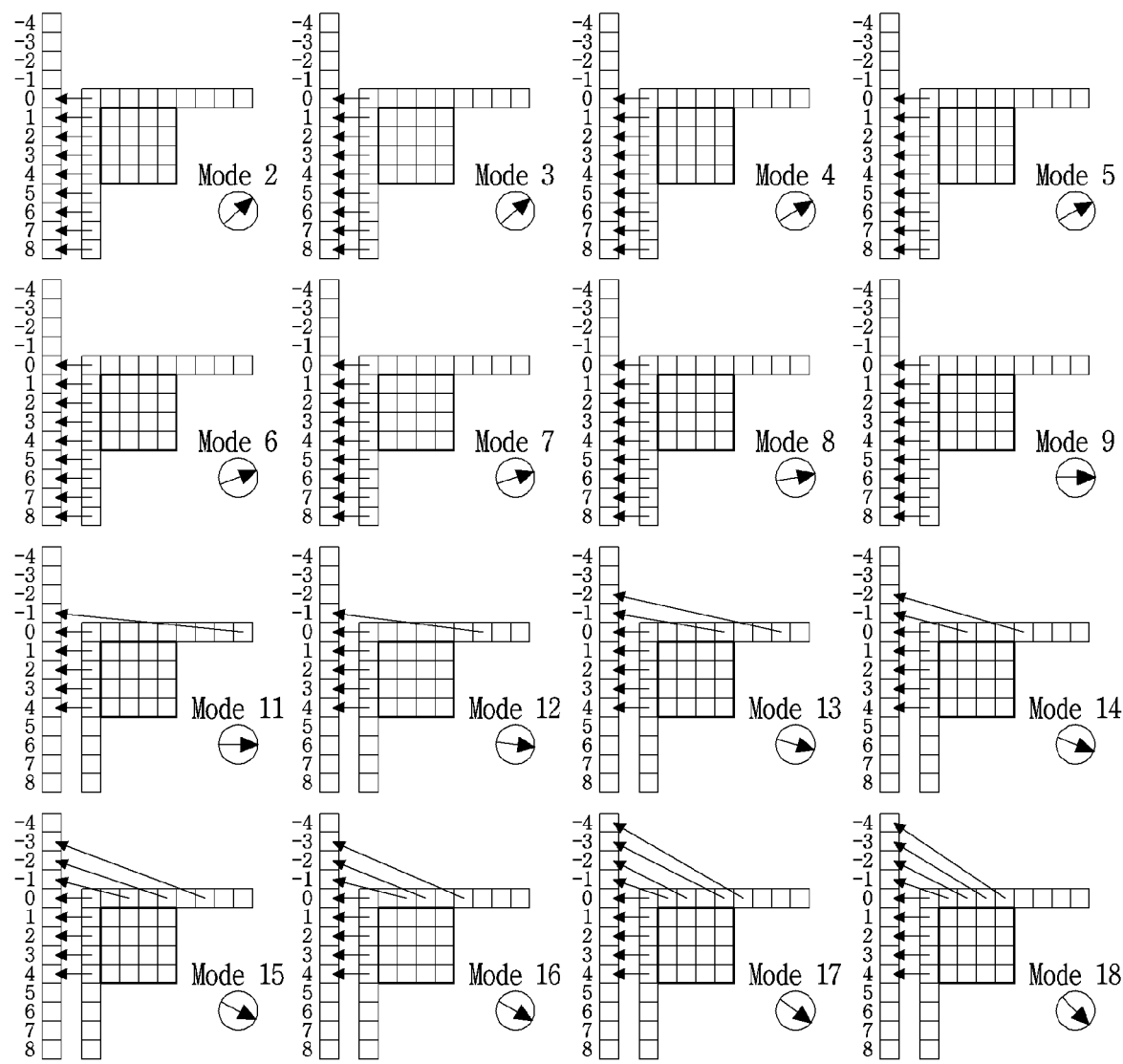
FIG. 22 is a view showing an embodiment of generating $p_{1,ref}$ for a 4×4 block when a straight-directional mode is a horizontal direction.

FIG. 22 is a view showing an embodiment of generating $p_{1,ref}$ for a 4×4 block when a straight-directional mode is a horizontal direction.

For example, as shown in FIG. 17, when a number of directional intra prediction modes is 33, from a mode 2 to a mode 18 are straight-directional modes that perform prediction in a horizontal direction. Herein, the generating of $p_{1,ref}$ for the 4×4 block may be as shown in FIG. 22.

Figure 23:
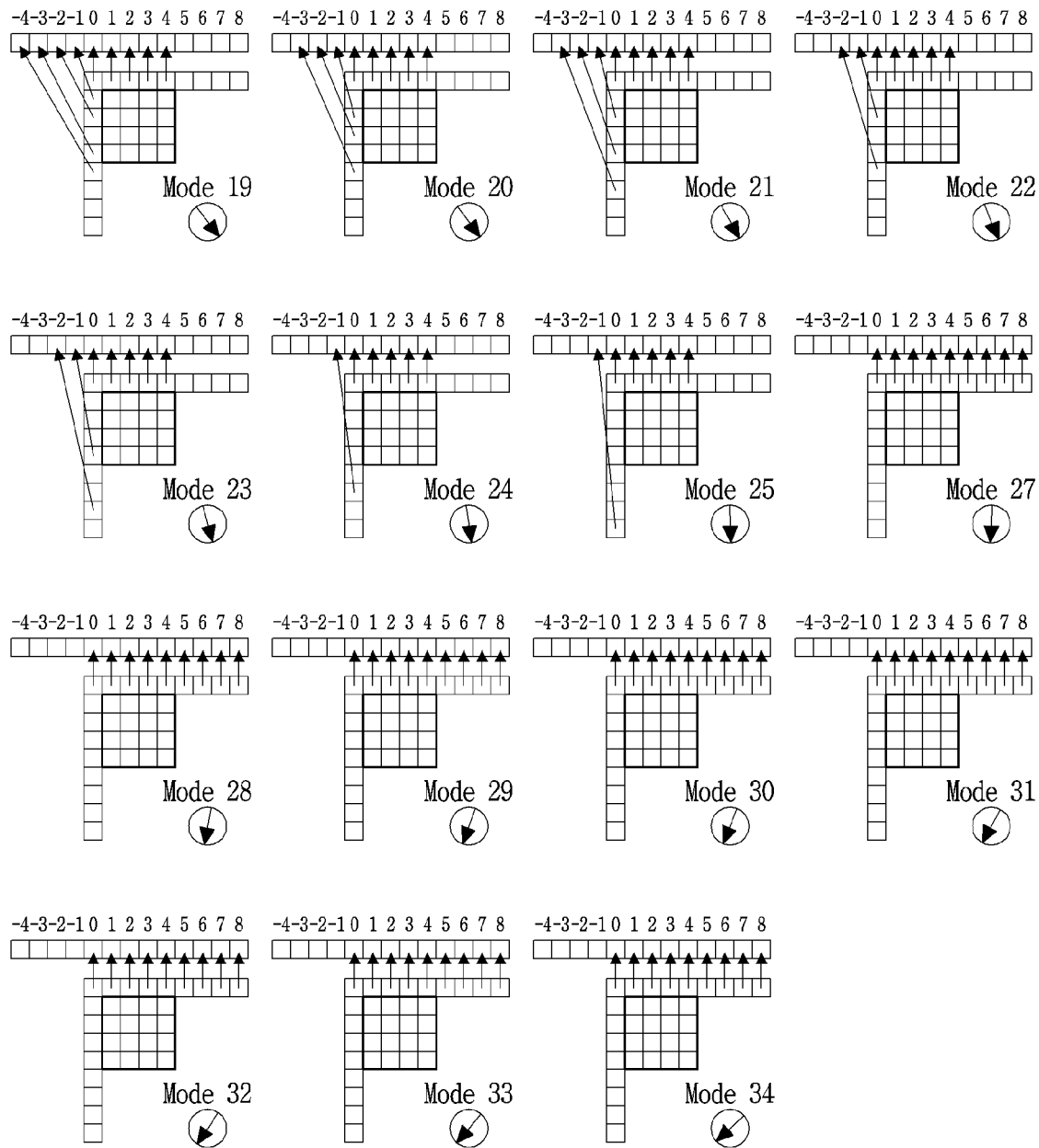
FIG. 23 is a view showing an embodiment of generating $p_{1,ref}$ for a 4×4 block when a straight-directional mode is a vertical direction.

FIG. 23 is a view showing an embodiment of generating $p_{1,ref}$ for a 4×4 block when a straight-directional mode is a vertical direction.

For example, as shown in FIG. 17, when a number of directional intra prediction modes are 33, from a mode 19 to a mode 34 are straight-directional modes that perform prediction in a vertical direction. Herein, the generating of $p_{1,ref}$ for the 4×4 block may be as shown in FIG. 23.

Embodiments described with reference to FIGS. 22 and 23 are embodiments in which a number of straight-directional modes is 33. Accordingly, when a number of straight-directional modes varies, generating $p_{1,ref}$ based on $P_{ang}$ may be performed in a different form while maintaining the same method.

When generating a prediction block using $p_{1,ref}$, interpolated prediction in a real number unit may be performed. For example, based on an angle parameter intraPredAngle corresponding to each straight-directional prediction mode, an offset value iIdx and/or a weight iFact for prediction sample interpolation according to a position of a pixel in a current block may be determined as below.

For example, when performing interpolation in a ⅟32 pel unit, an offset value and a weight for straight-directional modes that are from a mode 19 to a mode 34 of FIG. 17 and which perform prediction in a vertical direction may be determined by using the Formula 6 below.

$$iIdx=((y+1)*intraPredAngle)>>5$$

$$iFact=((y+1)*intraPredAngle)\&31 \quad [\text{Formula 6}]$$

A prediction sample value may be differently determined according to an iFact value of the above Formula 6. For example, when the iFact value is not 0, a position of prediction in $p_{1,ref}$ becomes a real number unit rather than an integer unit (full pixel location). Accordingly, a prediction sample value may be generated by using a plurality of reference pixels that is adjacent to a real number position. Herein, the plurality of reference pixels may be positioned at, at least one of an upper side, a lower side, a left side, a right side, and a diagonal side of the real number position. A number of reference pixels may be, 2, 3, or more. For example, a prediction sample value at a position (x, y) may be generated by using the Formula 7 below.

$$predSamples[x][y]((32-iFact)*p_{1,ref}[x+iIdx+1]+iFact*p_{1,ref}[x+iIdx+2]+16)>>5 \quad [\text{Formula 7}]$$

For example, when the iFact value is 0, a prediction sample value may be generated by using the Formula 8 below.

$$predSamples[x][y]=p_{1,ref}[x+iIdx+1] \quad [\text{Formula 8}]$$

When prediction modes are in a horizontal direction (from a mode 2 to a mode 18 of FIG. 17), the Formula in which positions of x and y are changed in the Formulas 6 to 8 may be applied. Described interpolated prediction in a ⅟32 pel unit may be an embodiment, interpolated prediction in a 1/N pel (N is a positive integer) unit may be applied.

In case of a horizontal direction mode and/or a vertical direction mode among directional prediction modes, reference pixel filtering for may not be performed. In addition, by using a reference target pixel and a reference pixel in which an x position and a y position thereof are identical as a prediction sample, interpolated prediction may not be necessary. In addition, when prediction is available by using only reference pixels of an upper side or a left side, a process of generating an 1-D reference pixel array $p_{1,ref}$ may not be necessary.

In case of a horizontal direction mode and/or a vertical direction mode among directional prediction modes, filtering may be additionally performed for boundary rows/columns of a prediction block after generating the prediction block of the current block.

Figure 24:
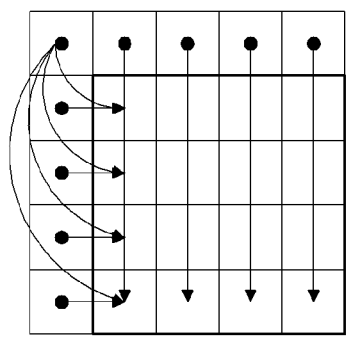
FIG. 24 is a view showing an embodiment of filtering boundary rows/columns of a prediction block when the prediction mode is a vertical direction.

FIG. 24 is a view showing an embodiment of filtering boundary rows/columns of a prediction block when the prediction mode is a vertical direction.

As shown in FIG. 24, filtering may be performed on a first column of a left side of the prediction block. For filtering, for example, the below Formula 9 may be used.

$$B_c(0,y)=p_{ref}(0,-1)+½(p_{ref}(-1,y)-p_{ref}(-1,-1)) \quad [\text{Formula 9}]$$

In addition, for directional prediction modes in horizontal and vertical directions, filtering of another method may be performed on N rows and/or columns of a left side and/or an upper side of the prediction block. Herein, N may be an integer smaller than a block size of the prediction block.

For example, when a prediction block is generated using equal to or greater than a plurality of reference pixel lines, filtering may be performed by using a change amount between reference pixels present in the same line or a change amount between reference pixels present in different lines.

In case of straight-directional prediction, when a curve having a number of image characteristics is included in a current block, encoding efficiency may decrease. In order to improve this, intra prediction for the current block may be performed by using curved modes.

In addition, when encoding/decoding is performed on a current block including a curve by using only a straight-directional mode, a data amount to be transmitted, in other words, signaling overhead, may increase since a target block may be divided into smaller blocks to reduce a prediction error. However, when encoding/decoding is performed on a current block having identical characteristics by using curved prediction, encoding efficiency may increase since a prediction block having the same level of a prediction error may be generated even though a block is not divided into sub-blocks.

In case of straight-directional prediction, as described above, generating prediction values of positions (x, y) of all pixels within the prediction block may use a reference pixel value of a reference pixel positioned at spaced apart by intraPredAngle that corresponds to a prediction mode predModeIntra.

For example, in FIG. 20, when predModeIntra is 2, a prediction value of an arbitrary position (x, y) within the prediction block may be calculated by using a reference pixel positioned at 32 degrees apart toward a left lower side based on a right angle direction.

In case of curved prediction, different to straight-directional prediction, prediction may be performed by using reference pixels having angles different from each other (or predModeIntra having angles different from each other) according to a position (x, y) of a prediction target pixel within the prediction block.

FIG. 25 is a view showing an embodiment using reference pixels having different angles according to a position of a pixel within the prediction block.

For example, as shown in FIG. 25(*a*), a prediction value may be generated in a pixel unit within the prediction block by using reference pixels positioned at angles different from each other.

Alternatively, as shown in FIG. 25(*b*), a prediction value may be generated in a horizontal line unit within the prediction block by using reference pixels positioned at angles different from each other.

Alternatively, as shown in FIG. 25(*c*), a prediction value may be generated in a vertical line unit within the prediction block by using reference pixels positioned at angles different from each other.

Alternatively, as shown in FIG. 25(*d*), a prediction value may be generated in a diagonal line unit within the prediction block by using reference pixels positioned at angles different from each other.

Alternatively, as shown in FIG. 25(*e*), a prediction value may be generated in a right angle line (L-shape line) unit within the prediction block by using reference pixels positioned at angles different from each other.

Intra prediction may be performed by selecting one method among the plurality of methods described with reference to FIG. 25. The selecting of the one method may be performed in a predetermined unit. For example, the selection of the method may be performed in a unit of at least one of a video, a sequence, a picture, a slice, a tile, a coding tree unit, a coding unit, a prediction unit and a transform unit. Herein, the selection may be based on information signaled in the predetermined unit or may be derived by the predetermined unit. Alternatively, a method predetermined by an encoder and a decoder may be applied.

When generating a curved intra prediction block by grouping by line, N (N is a positive integer) angles capable of being used for each line may be stored in and used as an LUT.

When converting a two-dimensional block form coefficient into a one-dimensional block form coefficient by generating and transforming a residual block between a curved prediction block and a current block, scanning methods different from each other may be applied according to a type of selected curved prediction. For scanning, for example, up right scan, vertical scan, horizontal scan, zigzag scan, etc. may be applied.

When generating a prediction block by performing directional or non-directional intra prediction, a reference pixel of at least one of a plurality of lines (N-lines, N is a positive integer)) which is adjacent to the current block at a left side and/or an upper side of may be used.

Figure 26:
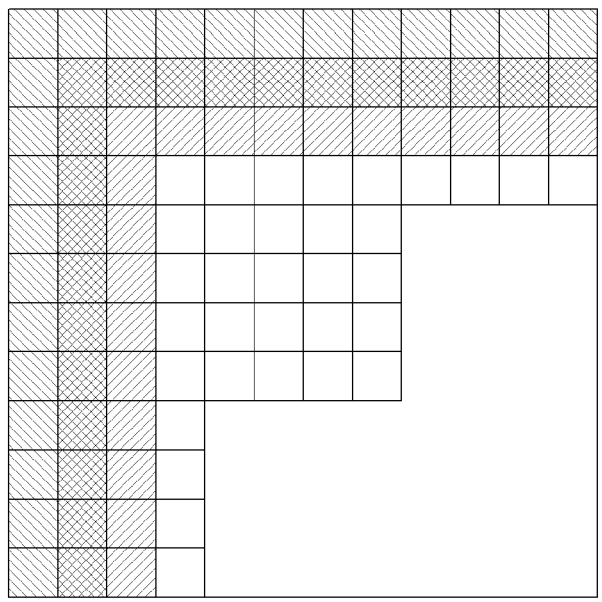
FIG. 26 is a view showing an embodiment of a reference pixel of a plurality of lines, the reference pixel being used for intra prediction of the current block.

FIG. 26 is a view showing an embodiment of a reference pixel of a plurality of lines, the reference pixel being used for intra prediction of the current block.

As shown in FIG. 26, when predicting a 4×4 block by using four reference lines, a reference pixel may be generated from one reference line among the four reference lines.

Alternatively, the reference pixel may be generated from four reference lines different from each other.

Alternatively, the reference pixel may be generated by applying a weighted sum to a reference line of a plurality of reference lines selected from four reference lines (for example, equal to or greater than 2 and equal to or less than 4).

Intra prediction may be performed by selecting one method among the plurality of methods described with reference to FIG. 26. The selecting of the single method may be performed in a predetermined unit. For example, the selection of the method may be performed in a unit of at least one of a video, a sequence, a picture, a slice, a tile, a coding tree unit, a coding unit, a prediction unit and a transform unit. Herein, the selection may be based on information signaled in the predetermined unit or may be derived in the predetermined unit. Alternatively, a method predetermined by an encoder and a decoder may be applied.

The directional or non-directional intra prediction may be applied to a square shaped block and/or a non-square shaped block.

As an embodiment of curved intra prediction, as described with reference to FIG. 20, a position of a reference pixel for generating a prediction value of an arbitrary position (x, y) within a prediction block may be determined by using the curvature parameter cuv and the weight parameter $cw_i$ (i=0, 1, . . . , $N_s$−1, $N_s$: block size).

For example, in case of curved intra prediction 'from a right upper side to a left lower side', a position of a reference pixel for generating a prediction value of an arbitrary position (x, y) within a prediction block may be determined by a row unit as the Formula 10 below.

$$y^{th} \text{ row} \rightarrow p(\text{pos},-1), \text{ where pos}=x+\frac{1}{2}*(x+y)+ cw_y*cuv*(x+1) \text{ for } y=0,1,\ldots,N_s-1 \quad [\text{Formula 10}]$$

In case of curved intra prediction using the above Formula 10, by adjusting cuv, a size of a curvature may be adjusted. cuv may be a real number equal to or greater than zero. For example, the larger cuv value becomes, the larger curvature becomes, and positions of reference pixels may move to the right. Alternatively, the smaller the cuv value becomes, the smaller the curvature becomes, and the positions of the reference pixel may move to the left (up to the position of x).

When a target block is N×M, $cw_i$ may be a parameter including N weights that refers to a height of the block or a number of rows. Each weight may be a real number equal to or greater than zero. A position of a reference pixel used by a prediction pixel included in a corresponding row may be adjusted by adjusting $cw_i$. For example, the larger the $cw_i$ value becomes, positions of reference pixels used by the prediction pixel of an $i^{th}$ row may move to the right. Alternatively, the smaller the $cw_i$ value becomes, the positions of the reference pixels may move to the left (up to a position of x).

Accordingly, various forms of curved intra prediction may be performed by combining the curvature parameter cuv and/or the weight row parameter $cw_i$.

Figure 27:
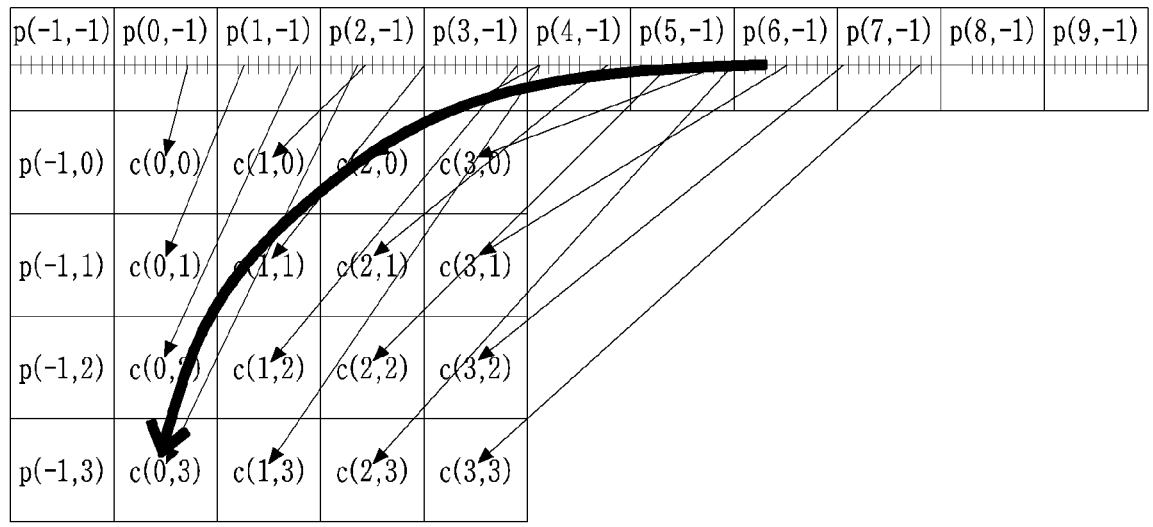
FIG. 27 is a view showing an embodiment of performing curved prediction in a direction from a right upper side to a left lower side by applying cuv=0.1, $cw_0$=1.0, $cw_1$=1.2, $cw_2$=1.4, and $cw_3$=1.6 to a current block having a 4×4 size.

FIG. 27 is a view showing an embodiment of performing curved prediction in a direction from a right upper side to a left lower side by applying cuv=0.1, $cw_0$=1.0, $cw_1$=1.2, $cw_2$=1.4, and $cw_3$=1.6 to a current block having a 4×4 size.

Figures 28, 29:
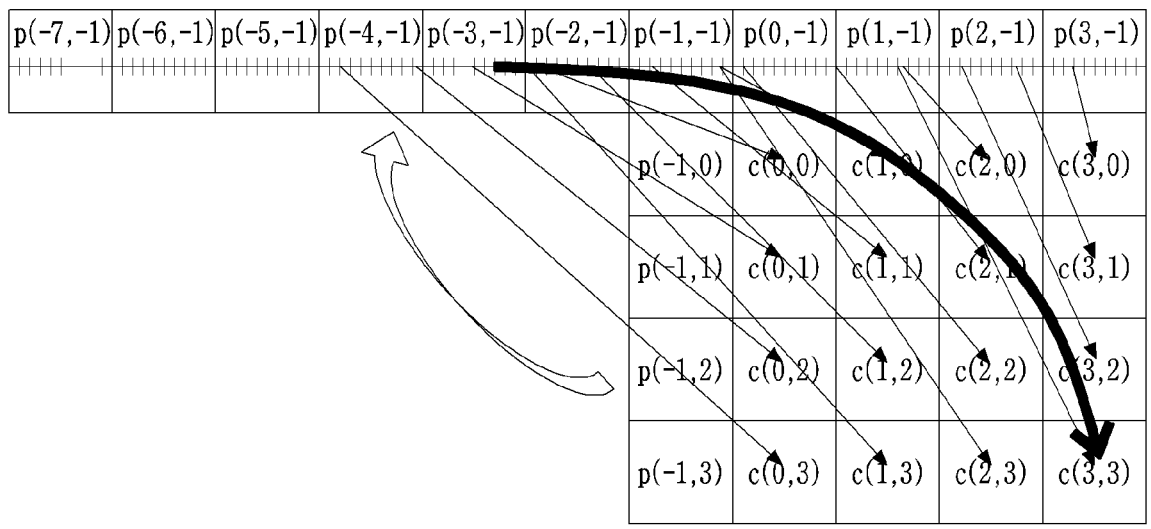
FIG. 28 is a view showing an embodiment, as a result of applying cuv and $cw_i$ of FIG. 27, of a position of a reference pixel used by a prediction pixel within a current block.
FIG. 29 is a view showing an embodiment of performing curved prediction in a direction from a left upper side to a right lower side (type-1) by applying cuv=0.1, $cw_0$=1.0, $cw_1$=1.2, $cw_2$=1.4, and $cw_3$=1.6 to a current block having a 4×4 size.

FIG. 28 is a view showing an embodiment, as a result of applying cuv and $cw_i$ of FIG. 27, of a position of a reference pixel used by a prediction pixel within a current block.

In order to generate a prediction pixel value, described interpolated prediction in 1/N pel unit may be performed. N may be a positive integer.

For example, when a position of a reference pixel of a prediction target pixel is a positive integer unit, the prediction target pixel predPixels[x] [y] may be derived by a reference pixel p(pos, −1). pos may refer to a position of the reference pixel.

For example, when the position of the reference pixel of the prediction target pixel is a real number inter unit, predPixels[x] [y] may be derived as an interpolated prediction number obtained by perforating interpolated prediction in 1/N pel unit on p(floor(pos), −1) and p(ceil(pos), −1). floor(pos) may be an integer value equal to or smaller than pos, and refer to the maximum value. ceil(pos) may be an integer equal to or greater than pos, and refer to the minimum value.

As described above, for convenience of calculation, $p_{ref}$ may be converted into $p_{1,ref}$ before generating the prediction sample value.

When a position pos of a reference pixel exceeds the maximum range (in FIG. 27, exceeding P(7, −1)) of an available reference pixel, calculated positions of all reference pixels may be used after being converted into respective normalized values by matching with the maximum range of the available reference pixel.

For example, in case of curved intra prediction 'from a left upper side to a right lower side (type-1)', a position of a reference pixel for generating a prediction value of an arbitrary position (x, y) within a prediction block may be determined by a row unit as the Formula 11 below.

$y^{th}$ row→$p(pos,−1)$, where pos=$x−½*(N_s−1−x+y)−$
$cw_y*cuv*(N_s−x)$ for $y=0,1,\ldots,N_s−1$ [Formula 11]

In case of curved intra prediction using the above Formula 11, a size of a curvature by be adjusted by adjusting cuv. cuv may be a real number equal to or greater than zero. For example, the larger the cuv value becomes, the larger curvature becomes, and positions of reference pixels may move to the left. Alternatively, the smaller the cuv value becomes, the smaller curvature becomes, and the positions of the reference pixels may move to the right (up to a position of x).

When a target block is N×M, $cw_i$ may be a parameter including N weights that refers to a height of the block or a number of rows. Each weight may be a real number equal to or greater than zero. A position of a reference pixel used by a prediction pixel included in a corresponding row may be adjusted by adjusting $cw_i$. For example, the larger the $cw_i$ value becomes, positions of reference pixels used by prediction pixels of an $i^{th}$ row may move to the left. Alternatively, the smaller the $cw_i$ value becomes, the positions of the reference pixels may move to the right (up to a position of x).

Accordingly, various forms of curved intra prediction may be performed by combining the curvature parameter cuv and/or the weight row parameter $cw_i$.

FIG. 29 is a view showing an embodiment of performing curved prediction in a direction from a left upper side to a right lower side (type-1) by applying cuv=0.1, $cw_0$=1.0, $cw_1$=1.2, $cw_2$=1.4, and $cw_3$=1.6 to a current block having a 4×4 size.

FIG. 30 is a view showing an embodiment, as a result of applying cuv and $cw_i$ of FIG. 29, of a position of a reference pixel used by a prediction pixel within a current block.

In order to generate a prediction pixel value, described interpolated prediction in 1/N pel unit may be performed. N may be a positive integer.

For example, when a position of a reference pixel of a prediction target pixel is a positive integer unit, prediction target pixel predPixels[x][y] may be derived as a reference pixel p(pos, −1).

For example, when the position of the reference pixel of the prediction target pixel is a real number unit, predPixels[x][y] may be derived as an interpolated prediction value obtained by performing interpolated prediction in 1/N pel unit on p(floor(pos), −1) and p(ceil(pos), −1).

As described above, for convenience of calculation, $p_{ref}$ may be converted into $p_{1,ref}$ before generating the prediction sample value.

When a position pos of a reference pixel exceeds the maximum range (in FIG. 29, exceeding P(−7, −1))) of an available reference pixel, calculated positions of all reference pixels may be used after being converted into respective normalized values by matching with the maximum range of the available reference pixel.

For example, in case of curved intra prediction 'from a left lower side to a right upper side', a position of a reference pixel for generating a prediction value of an arbitrary position (x, y) within the prediction block may be determined by a column unit as the Formula 12 below.

$x^{th}$ column→$p(−1,pos)$, where pos=$y+½*(x+y)+$
$cw_x*cuv*(y+1)$ for $x=0,1,\ldots,N_s−1$ [Formula 12]

In case of curved intra prediction using the above Formula 12, a size of a curvature may be adjusted by adjusting cuv. cuv may be a real number equal to or greater than zero. For example, the larger the cuv value becomes, the larger the curvature becomes, and positions of reference pixels may move downwards. Alternatively, the smaller the cuv value becomes, the smaller the curvature becomes, and the positions of the reference pixels may move upwards (up to a position of y).

When a target block is N×M, $cw_i$ may be a parameter including M weights that refers to a width of the block or a number of columns. Each weight may be a real number equal to or greater than zero. A position of a reference pixel used by a prediction pixel included in a corresponding column may be adjusted by adjusting $cw_i$. For example, the larger the $cw_i$ value becomes, positions of reference pixels used by prediction pixels of an $i^{th}$ column may move downwards. Alternatively, the smaller the $cw_i$ value becomes, the positions of the reference pixels may move upwards (up to a position of y).

Accordingly, various forms of curved intra prediction may be performed by combining the curvature parameter cuv and/or the weight column parameter $cw_i$.

Figure 31:
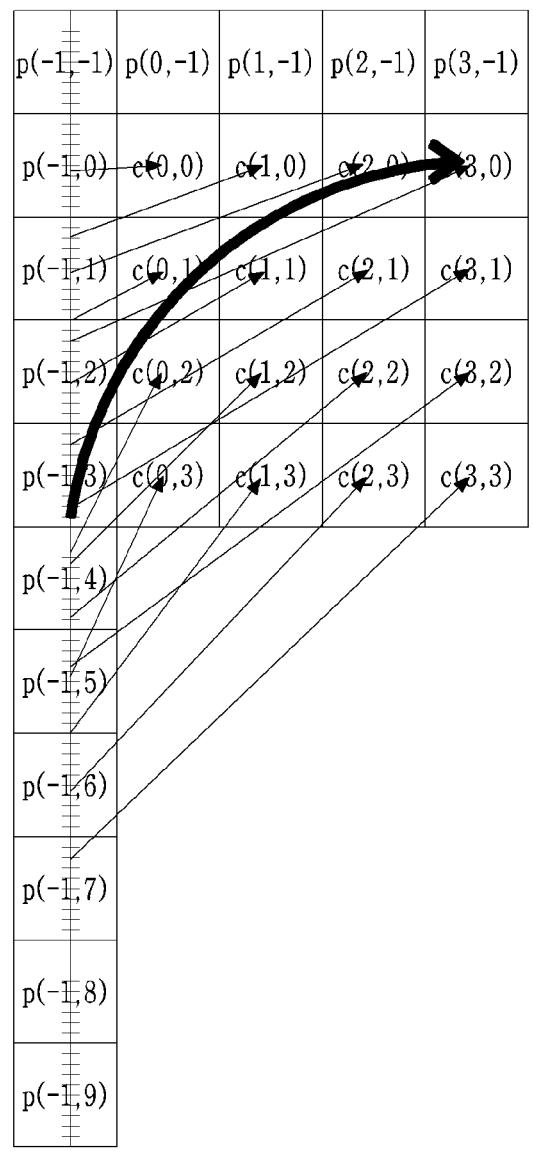
FIG. 31 is a view showing an embodiment of performing curved prediction in a direction from a left lower side to a right upper side by applying cuv=0.1, $cw_0$=1.0, $cw_1$=1.2, $cw_2$=1.4, and $cw_3$=1.6 to a current block having a 4×4 size.

FIG. 31 is a view showing an embodiment of performing curved prediction in a direction from a left lower side to a right upper side by applying cuv=0.1, $cw_0$=1.0, $cw_1$=1.2, $cw_2$=1.4, and $cw_3$=1.6 to a current block having a 4×4 size.

FIG. 32 is a view showing an embodiment, as a result of applying cuv and $cw_i$ of FIG. 31, of a position of a reference pixel used by a prediction pixel within a current block.

In order to generate a prediction pixel value, described interpolated prediction in 1/N pel unit may be performed. N may be a positive integer.

For example, when a position of a reference pixel of a prediction target pixel is an integer unit, the prediction target pixel predPixels[x][y] may be derived as a reference pixel p(−1, pos).

For example, when the position of the reference pixel of the prediction target pixel is a real number unit, predPixels[x][y] may be derived as an interpolated prediction value obtained by performing interpolated prediction in 1/N pel unit on p(−1, floor(pos)) and p(−1, ceil(pos)).

As described above, for convenience of calculation, $p_{ref}$ may be converted into $p_{1,ref}$ before generating the prediction sample value.

When a position pos of a reference pixel exceeds the maximum range (in FIG. 31, exceeding P(−1, 7)) of an available reference pixel, calculated positions of all reference pixels may be used after being converted into respective normalized values by matching with the maximum range of the available reference pixel.

For example, in case of curved intra prediction 'from a left upper side to a right lower side (type-2)', a position of a reference pixel for generating a prediction value of an arbitrary position (x, y) within the prediction block may be determined by a column unit as the Formula 13 below.

$x^{th}$ column→$p(-1,pos)$, where pos=$y-½*(N_9-1-y+x)-cw_x*cuv*(N_s-y)$ for x=0, 1, . . . ,$N_s$-1     [Formula 13]

In case of curved intra prediction using the above Formula 13, a size of a curvature may be adjusted by adjusting cuv. cuv may be a real number equal to or greater than zero. For example, the larger the cuv value becomes, the larger the curvature becomes, and positions of reference pixels may move upwards. Alternatively, the smaller the cuv value becomes, the smaller the curvature becomes, and the positions of the reference pixels may move downwards (up to a position of y).

When a target block is N×M, $cw_i$ may be a parameter including M weights that refer to a width of the block or a number of columns. Each weight may be a real number equal to or greater than zero. A position of a reference pixel used by a prediction pixel included in a corresponding column may be adjusted by adjusting $cw_i$. For example, the larger the $cw_i$ value becomes, positions of reference pixels used by prediction pixels of an $i^{th}$ column may move upwards. Alternatively, the smaller the $cw_i$ value becomes, the positions of the reference pixels may move downwards (up to a position of y).

Accordingly, various forms of curved intra prediction may be performed by the curvature parameter cuv and/or the weight column parameter $cw_i$.

Figure 33:
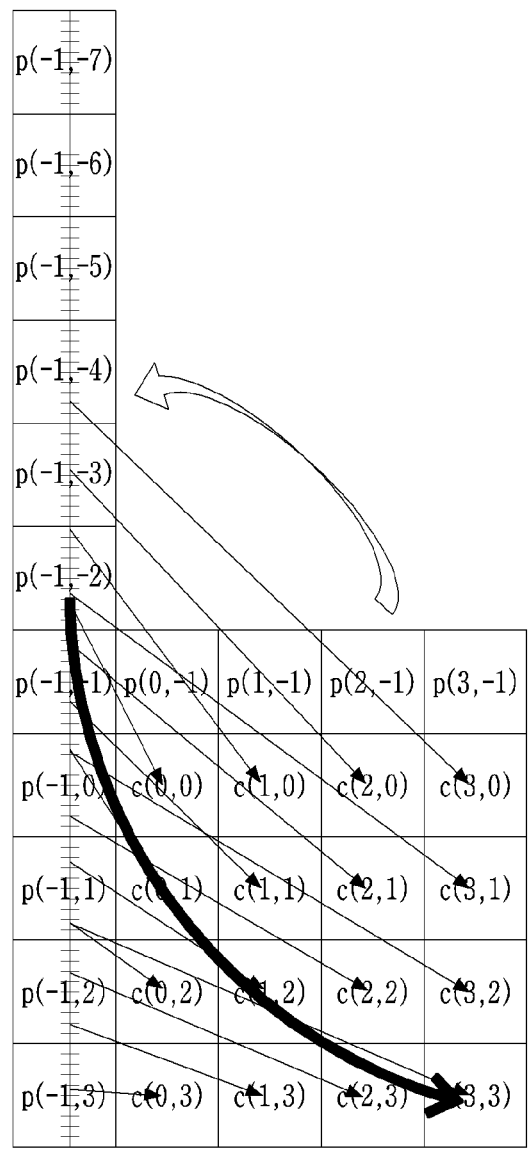
FIG. 33 is a view showing an embodiment of performing curved prediction in a direction from a left upper side to a right lower side (type-2) by applying cuv=0.1, $cw_0$=1.0, $cw_1$=1.2, $cw_2$=1.4, and $cw_3$=1.6 to a current block having a 4×4 size.

FIG. 33 is a view showing an embodiment of performing curved prediction in a direction from a left upper side to a right lower side (type-2) by applying cuv=0.1, $cw_0$=1.0, $cw_1$=1.2, $cw_2$=1.4, and $cw_3$=1.6 to a current block having a 4×4 size.

Figures 34, 35:
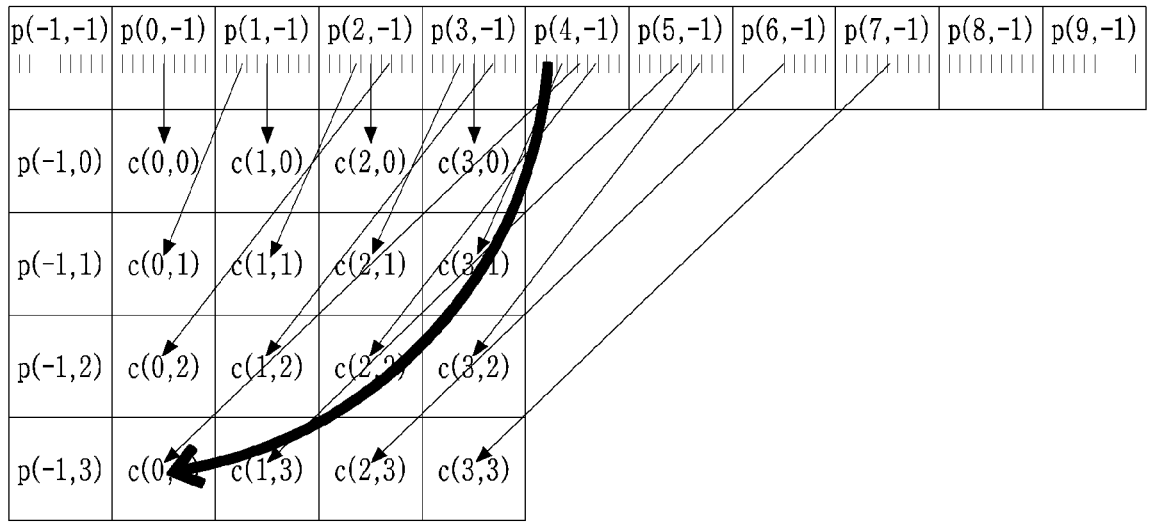
FIG. 34 is a view showing an embodiment, as a result of applying cuv and $cw_i$ of FIG. 33, of a position of a reference pixel used by a prediction pixel within the current block.
FIG. 35 is a view showing an embodiment of performing curved prediction in a direction from an upper side to a left lower side by applying cuv=0.6, $cw_0$=1.0, $cw_1$=1.4, $cw_2$=1.8, and $cw_3$=2.2 to a current block having a 4×4 size.

FIG. 34 is a view showing an embodiment, as a result of applying cuv and $cw_i$ of FIG. 33, of a position of a reference pixel used by a prediction pixel within the current block.

In order to generate a prediction pixel value, described interpolated prediction in 1/N pel unit may be performed. N may be a positive integer.

For example, when a position of a reference pixel of a prediction target pixel is an integer unit, the prediction target pixel predPixels[x][y] may be derived as a reference pixel p(-1, pos).

For example, when the position of the reference pixel of the prediction target pixel is a real number unit, predPixels[x][y] may be derived as an interpolated prediction value obtained by performing interpolated prediction in 1/N pel unit on p(-1, floor(pos)) and p(-1, ceil(pos)).

As described above, for convenience of calculation, $p_{ref}$ may be converted into $p_{1,ref}$ before generating the prediction sample value.

When a position pos of a reference pixel exceeds the maximum range (in FIG. 33, exceeding P(-1, -7)) of an available reference pixel, calculated positions of all reference pixels may be used after being converted into respective normalized values by matching with the maximum range of the available reference pixel.

For example, in case of curved intra prediction 'from an upper side to a left lower side', a position of a reference pixel for generating a prediction value of an arbitrary position (x, y) within the prediction block may be determined by a row unit as the Formula 14 below.

$y^{th}$ row→$p(pos,-1)$, where pos=$x+cw_y*cuv*y$ for y=0,1, . . . ,$N_s$-1     [Formula 14]

In case of curved intra prediction using the above Formula 14, a size of a curvature may be adjusted by adjusting cuv. cuv may be a real number equal to or greater than zero. For example, the larger the cuv value becomes, the larger the curvature becomes, and positions of reference pixels may move to the right. Alternatively, the smaller the cuv value becomes, the smaller the curvature becomes, and the positions of the reference pixels may move to the left (up to a position of x).

When a target block is N×M, $cw_i$ may be a parameter including N weights that refers to a height of the block or a number of rows. Each weight may be a real number equal to or greater than zero. A position of a reference pixel used by a prediction pixel included in a corresponding row may be adjusted by adjusting $cw_i$. For example, the larger the $cw_i$ value becomes, positions of reference pixels used by prediction pixels of an $i^{th}$ row may move to the right. Alternatively, the smaller the $cw_i$ value becomes, the positions of the reference pixels may move to the left (up to a position of x).

Accordingly, various forms of curved intra prediction may be performed by combining the curvature parameter cuv and/or the weight row parameter $cw_i$.

FIG. 35 is a view showing an embodiment of performing curved prediction in a direction from an upper side to a left lower side by applying cuv=0.6, $cw_0$=1.0, $cw_1$=1.4, $cw_2$=1.8, and $cw_3$=2.2 to a current block having a 4×4 size.

Figures 36, 37:
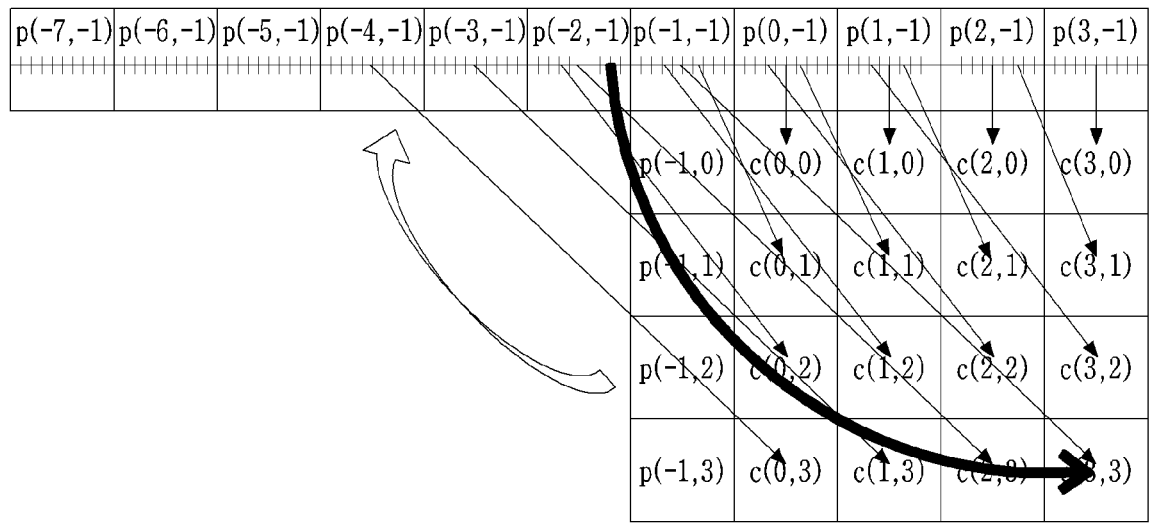
FIG. 36 is a view showing an embodiment, as a result of applying cuv and $cw_i$ of FIG. 35, of a position of a reference pixel used by a prediction pixel within the current block.
FIG. 37 is a view showing an embodiment of performing curved prediction in a direction from an upper side to a right lower side by applying cuv=0.6, $cw_0$=1.0, $cw_1$=1.4, $cw_2$=1.8, and $cw_3$=2.2 to a current block having a 4×4 size.

FIG. 36 is a view showing an embodiment, as a result of applying cuv and $cw_i$ of FIG. 35, of a position of a reference pixel used by a prediction pixel within the current block.

In order to generate a prediction pixel value, described interpolated prediction in 1/N pel unit may be performed. N may be a positive integer.

For example, when a position of a reference pixel of a prediction target pixel is an integer unit, the prediction target pixel predPixels[x][y] may be derived as a reference pixel p(pos, -1).

For example, when the position of the reference pixel of the prediction target pixel is a real number unit, predPixels[x][y] may be derived as an interpolated prediction value obtained by performing interpolated prediction in 1/N pel unit on p(floor(pos), -1) and p(ceil(pos), -1).

As described above, for convenience of calculation, $p_{ref}$ may be converted into $p_{1,ref}$ before generating the prediction sample value.

When a position pos of a reference pixel exceeds the maximum range (in FIG. 35, exceeding P(7, -1)) of an available reference pixel, calculated positions of all reference pixels may be used after being converted into respective normalized values by matching with the maximum range of the available reference pixel.

For example, in case of curved intra prediction 'from an upper side to a right lower side', a position of a reference pixel for generating a prediction value of an arbitrary position (x, y) within the prediction block may be determined by a row unit as the Formula 15 below.

$y^{th}$ row→$p(pos,-1)$, where pos=$x-cw_y*cuv*y$ for y=0,1, . . . ,$N_s$-1     [Formula 15]

In case of curved intra prediction using the above Formula 15, a size of a curvature may be adjusted by adjusting cuv. cuv may be a real number equal to or greater than zero. For example, the larger the cuv value becomes, the larger the curvature becomes, and positions of reference pixels may move to the left. Alternatively, the smaller the cuv value becomes, the smaller the curvature becomes, and the positions of the reference pixels may move to the right (up to a position of x).

When a target block is N×M, $cw_i$ may be a parameter including N weights that refers to a height of the block or a number of rows. Each weight may be a real number equal to or greater than zero. A position of a reference pixel used by a prediction pixel included in a corresponding row may be adjusted by adjusting $cw_i$. For example, the larger the $cw_i$ value becomes, positions of reference pixels used by prediction pixels of an $i^{th}$ row may move to the left. Alternatively, the smaller the $cw_i$ value becomes, the positions of the reference pixels may move to the right (up to a position of x).

Accordingly, various forms of curved intra prediction may be performed by combining the curvature parameter cuv and/or the weight row parameter $cw_i$.

FIG. 37 is a view showing an embodiment of performing curved prediction in a direction from an upper side to a right lower side by applying cuv=0.6, $cw_0$=1.0, $cw_1$=1.4, $cw_2$=1.8, and $cw_3$=2.2 to a current block having a 4×4 size.

FIG. 38 is a view showing an embodiment, as a result of applying cuv and $cw_i$ of FIG. 37, of a position of a reference pixel used by a prediction pixel within the current block.

In order to generate a prediction pixel value, described interpolated prediction in 1/N pel unit may be performed. N may be a positive integer.

For example, when a position of a reference pixel of a prediction target pixel is an integer unit, the prediction target pixel predPixels[x][y] may be derived as p(pos, −1).

For example, when the position of the reference pixel of the prediction target pixel is a real number unit, predPixels[x][y] may be derived as an interpolated prediction value obtained by performing interpolated prediction in 1/N pel unit on p(floor(pos), −1) and p(ceil(pos), −1).

As described above, for convenience of calculation, $p_{ref}$ may be converted into $p_{1,ref}$ before generating the prediction sample value.

When a position pos of a reference pixel exceeds the maximum range (in FIG. 37, exceeding P(−7, −1)) of an available reference pixel, calculated positions of all reference pixels may be used after being converted into respective normalized values by matching with the maximum range of the available reference pixel.

For example, in case of curved intra prediction 'from a left side to a right upper side', a position of a reference pixel for generating a prediction value of an arbitrary position (x, y) within the prediction block may be determined by a column unit as the Formula 16 below.

$x^{th}$ column→p(pos,−1), where pos=y+$cw_x$*cuv*x for
x=0,1, . . . ,$N_s$−1        [Formula 16]

In case of curved intra prediction using the above Formula 16, a size of a curvature may be adjusted by adjusting cuv. cuv may be a real number equal to or greater than zero. For example, the larger the cuv value becomes, the larger the curvature becomes, and positions of reference pixels may move downwards. Alternatively, the smaller the cuv value becomes, the smaller the curvature becomes, and the positions of the reference pixels may move upwards (up to a position of y).

When a target block is N×M, $cw_i$ may be a parameter including M weights that refers to a width of the block or a number of columns. Each weight may be a real number equal to or greater than zero. A position of a reference pixel used by a prediction pixel included in a corresponding column may be adjusted by adjusting $cw_i$. For example, the larger the $cw_i$ value becomes, positions of reference pixels used by prediction pixels of an $i^{th}$ column may move downwards. Alternatively, the smaller the $cw_i$ value becomes, the positions of the reference pixels may move upwards (up to a position of y).

Accordingly, various forms of curved intra prediction may be performed by combining the curvature parameter cuv and/or the weight column parameter $cw_i$.

Figure 39:
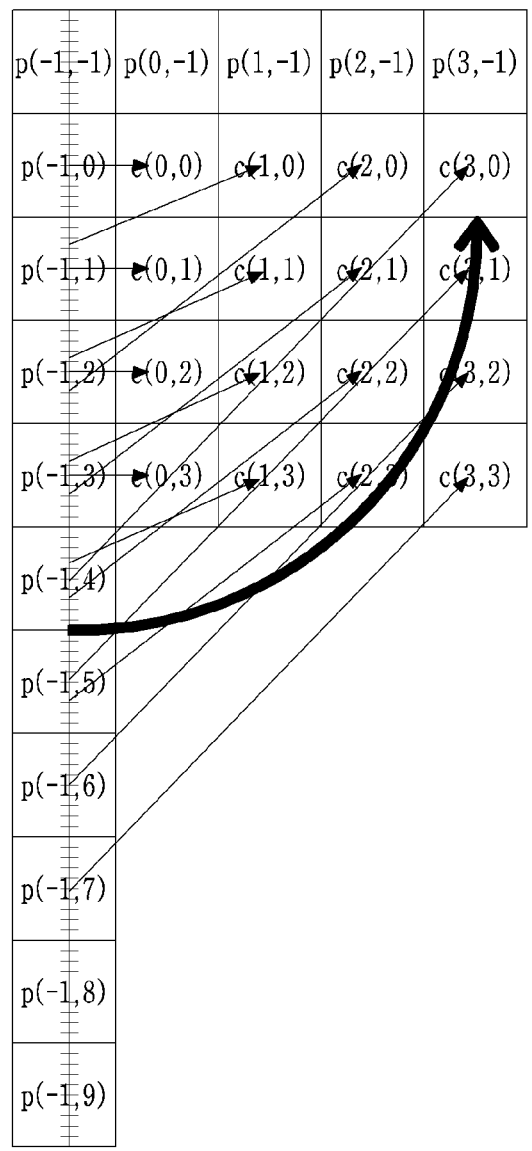
FIG. 39 is a view showing an embodiment of performing curved prediction in a direction from a left side to a right upper side by applying cuv=0.6 $cw_0$=1.0, $cw_1$=1.4, $cw_2$=1.8, and $cw_3$=2.2 to a current block having a 4×4 size.

FIG. 39 is a view showing an embodiment of performing curved prediction in a direction from a left side to a right upper side by applying cuv=0.6 $cw_0$=1.0, $cw_1$=1.4, $cw_2$=1.8, and $cw_3$=2.2 to a current block having a 4×4 size.

FIG. 40 is a view showing an embodiment, as a result of applying cuv and $cw_i$ of FIG. 39, of a position of a reference pixel used by a prediction pixel within the current block.

In order to generate a prediction pixel value, described interpolated prediction in 1/N pel unit may be performed. N may be a positive integer.

For example, when a position of a reference pixel of a prediction target pixel is an integer unit, the prediction target pixel predPixels[x][y] may be derived as a reference pixel p(−1, pos).

For example, when the position of the reference pixel of the prediction target pixel is a real number unit, predPixels[x][y] may be derived as an interpolated prediction value obtained by performing interpolated prediction in 1/N pel unit on p(−1, floor(pos)) and p(−1, ceil(pos)).

As described above, for convenience of calculation, $p_{ref}$ may be converted into $p_{1,ref}$ before generating the prediction sample value.

When a position pos of a reference pixel exceeds the maximum range (in FIG. 39, exceeding P(−1, 7)) of an available reference pixel, calculated positions of all reference pixels may be used after being converted into respective normalized values by matching with the maximum range of the available reference pixel.

For example, in case of curved intra prediction 'from a left side to a right lower side', a position of a reference pixel for generating a prediction value of an arbitrary position (x, y) of the prediction block may be determined by a column unit as the Formula 17 below.

$x^{th}$ column→p(pos,−1), where pos=y−$cw_x$*cuv*x for
x=0,1, . . . ,$N_s$−1        [Formula 17]

In case of curved intra prediction using the above Formula 17, a size of a curvature may be adjusted by adjusting cuv. cuv may be a real number equal to or greater than zero. For example, the larger the cuv value becomes, the larger the curvature becomes, and positions of reference pixels may move upwards. Alternatively, the smaller the cuv value becomes, the smaller the curvature becomes, and the positions of the reference pixels may move downwards (up to a position of y).

When a target block is N×M, $cw_i$ may be a parameter including M weights that refer to a width of the block or a number of columns. Each weight may be a real number equal to or greater than zero. A position of a reference pixel used by a prediction pixel included in a corresponding column may be adjusted by adjusting $cw_i$. For example, the larger the $cw_i$ value becomes, positions of reference pixels used by prediction pixels of an $i^{th}$ column may move upwards. Alternatively, the smaller the $cw_i$ value becomes, the positions of the reference pixels may move downwards (up to a position of y).

Accordingly, various forms of curved intra prediction may be performed by combining the curvature parameter cuv and/or the weight column parameter $cw_i$.

Figure 41:
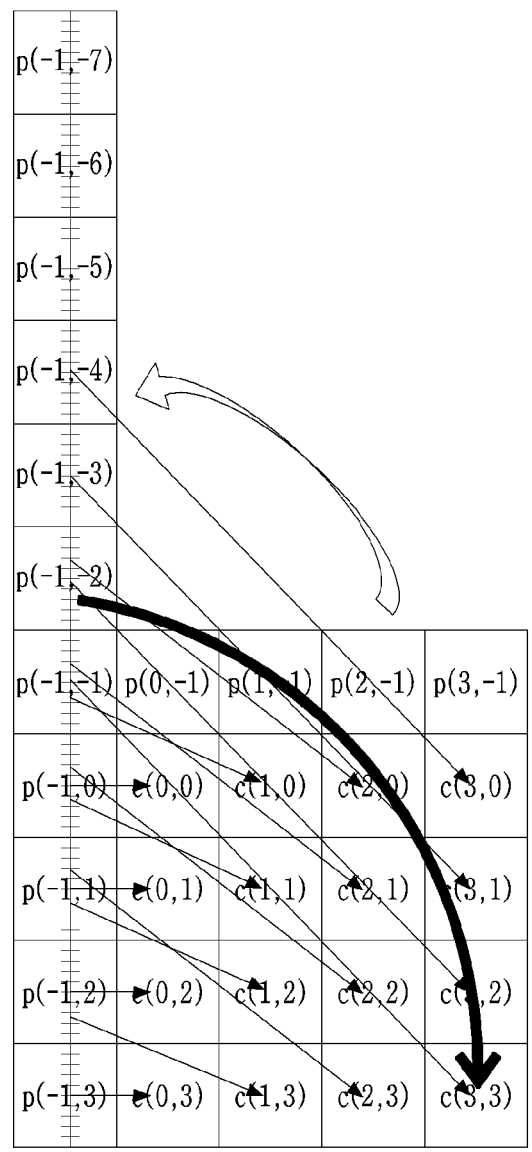
FIG. 41 is a view showing an embodiment of performing curved prediction in a direction from a left side to a right lower side by applying cuv=0.6, $cw_0$=1.0, $cw_1$=1.4, $cw_2$=1.8, and $cw_3$=2.2 to a current block having a 4×4 size.

FIG. 41 is a view showing an embodiment of performing curved prediction in a direction from a left side to a right lower side by applying cuv=0.6, $cw_0$=1.0, $cw_1$=1.4, $cw_2$=1.8, and $cw_3$=2.2 to a current block having a 4×4 size.

FIG. 42 is a view showing an embodiment, as a result of applying cuv and $cw_i$ of FIG. 41, of a position of a reference pixel used by a prediction pixel within the current block.

In order to generate a prediction pixel value, described interpolated prediction may be performed. N may be a positive integer.

For example, when a position of a reference pixel of a prediction target pixel is an integer unit, the prediction target pixel predPixels[x][y] may be derived as a reference pixel p(−1, pos).

For example, when the position of the reference pixel of the prediction target pixel is a real number unit, predPixels[x][y] may be derived as an interpolated prediction value obtained by performing interpolated prediction in 1/N pel unit on p(−1, floor(pos)) and p(−1, ceil(pos)).

As described above, for convenience of calculation, $p_{ref}$ may be converted into $p_{1,ref}$ before generating the prediction sample value.

When a position pos of a reference pixel exceeds the maximum range (in FIG. 41, exceeding P(−1, −7)) of an available reference pixel, calculated positions of all reference pixels may be used after being converted into respective normalized values by matching with the maximum range of the reference pixel.

In the embodiments described with reference to FIGS. 27 to 42, a single curvature parameter cuv is applied to a current block, and a single weight parameter cw is applied to a row or a column of the current block. However, it is not limited thereto. In other words, at least one curvature parameter $cuv_i$ and/or at least one weight parameter $cw_i$ may be applied to the current block. For example, as described with reference to FIG. 25, different curvature parameters $cuv_i$ and different weight parameters $cw_i$ may be applied to a pixel unit, a horizontal line unit, a vertical line unit, a diagonal line unit, a right angle line unit, a sub-block unit, and/or an arbitrary pixel group unit of the current block.

FIG. 43 is a view showing another embodiment of curved intra prediction.

As shown in FIG. 43, when a straight intra prediction mode is selected, curved intra prediction may be additionally performed based on the straight intra prediction mode.

For example, when a selected intra prediction mode is a non-directional mode (PLANAR_MODE or DC_MODE), curved prediction may not be performed.

In FIG. 43(a), when a selected straight intra prediction mode is included in a range A, curved prediction may be performed on at least one of a direction from a left lower side→a right upper side and a direction from a left side→a right upper side.

Alternatively, in FIG. 43(a), when the selected straight intra prediction mode is included in a range B, curved prediction may be performed on at least one of a direction from a left upper side→a right lower side (Type2) and a direction from a left side→a right lower side.

Alternatively, in FIG. 43(a), when the selected straight intra prediction mode is included in a range C, curved prediction may be performed on at least one of a direction from a left upper side→a right lower side (Type1) and a direction from an upper side→a right lower side.

Alternatively, in FIG. 43(a), when the selected straight intra prediction mode is included in a range D, curved prediction may be performed on at least one of a direction from a right upper side→a left lower side and a direction of an upper side→a left lower side.

Alternatively, in FIG. 43(b), when the selected straight intra prediction mode is included in a range A, curved prediction may be performed on at least one of a direction from a left side→a right lower side and a direction from a left side→a right upper side.

Alternatively, in FIG. 43(b), when the selected straight intra prediction mode is included in a range B, curved prediction may be performed on at least one of a direction from an upper side→a left lower side and a direction from an upper side→a right lower side.

Hereinbelow, steps of encoding or decoding information on intra prediction will be described in detail with reference to FIGS. 44 to 46 (S1203 and S1301).

An encoding apparatus according to the present disclosure may encode information on intra prediction to a bitstream in step S1203. The encoding may include entropy encoding.

FIG. 44 is a view showing an embodiment of a syntax structure of a bitstream including information on intra prediction according to the present disclosure.

As shown in FIG. 44, the information on intra prediction may include at least one piece of information among information below.

MPM (Most Probable Mode) flag: prev_intra_luma_pred_flag

MPM index: mpm_idx

Intra prediction mode information on luma component: rem_intra_luma_pred_mode

Intra prediction mode information on chroma component: intra_chroma_pred_mode

Curvature parameter of curved intra prediction mode: cuv1, cuv2, . . . .

Weight parameter of curved intra prediction mode: cw1, cw2, . . . .

Look-up-table (LUT) for curved intra prediction

The encoding apparatus may encode the information on intra prediction to a bitstream based on at least one of the above encoding parameters.

When an MPM (Most Probable Mode) flag is 1, an intra prediction mode of a luma component may be derived from candidate modes including intra modes of adjacent units having been already encoded/decoded by using an MPM index mpm_idx.

When the MPM (Most Probable Mode) flag is 0, the intra prediction mode of the luma component may be encoded/decoded by using intra prediction mode information on luma component rem_intra_luma_pred_mode.

An intra prediction mode of a chroma component may be encoded/decoded by using intra prediction mode information on chroma component intra_chroma_pred_mode and/or a corresponding intra prediction mode of a chroma component block.

A curvature parameter cuv of the curved intra prediction mode may refer to a curvature applied to the curved intra prediction mode. Curved intra prediction may be performed on a current block by using at least one cuv. A curvature parameter may be derived from at least one curvature parameter among curvature parameters of neighboring blocks.

A single or a plurality of weight parameters cw of the curved intra prediction mode may be applied to the current block. When a plurality of weight parameters cw is applied thereto, different weight parameters may be applied to a predetermined unit such as pixel, row, column, or sub-block, etc. of the current block. The weight parameter may be derived from at least one weight parameter among weight parameters of neighboring blocks.

Neighboring blocks for deriving the curvature parameter and/or the weight parameter may be blocks adjacent to the current block at an upper side, a left side and/or a right side and which have been already encoded/decoded.

Various forms of curved intra prediction may be performed by using at least one of cuv and cw.

When N cuvs and M cws are used, intra prediction of the current block may be performed by generating at least (N×M)×4 prediction blocks.

For example, when a single uv and a single cw are used, intra prediction of the current block may be performed by generating at least four prediction blocks.

For example, when two cuvs and a single cw are used, intra prediction of the current block may be performed by generating at least eight prediction blocks.

For example, when a single cuv and two cws are used, intra prediction of the current block may be performed by generating at least eight prediction blocks.

For example, when two cuvs and two cws are used, intra prediction of the current block may be performed by generating at least sixteen prediction blocks.

Information on at least two cuvs and/or cws may be encoded/decoded by using a default value and a delta value. Herein, the default value may refer to a single cuv value and/or a single cw value, and the delta value may be a constant value.

For example, when 2 cuvs are used in the current block, two curvature parameters may be default_cuv and default_cuv+delta_cuv.

For example, when N cuvs are used in the current block, N curvature parameters may be default_cuv, default_cuv+delta_cuv, default_cuv+2*delta_cuv, . . . , and default_cuv+(N−1)*delta_cuv. (Herein, N is a positive integer more than 2).

For example, when 2N+1 cuvs are used in the current block, 2N+1 curvature parameters may be default_cuv, default_cuv+delta_cuv, default_cuv−delta_cuv, default_cuv+2*delta_cuv, default_cuv−2*delta_cuv, . . . , default_cuv+N*delta_cuv, and default_cuv−N*delta_cuv. (Herein, N is a positive integer more than 1).

For example, when two cws are used in the current block, two weight parameters may be default_cw, and default_cw+delta_cw. (Herein, default_cw+delta_cw is a summation of an element unit of a vector).

For example, when M cws are used in the current block, M weight parameters may be default_cw, default_cw+delta_cw, default_cw+2*delta_cw, . . . , and default_cw+(M−1)*delta_cw. (Herein, default_cw+delta_cw is a summation of an element unit of a vector, M is positive integer more than 2).

For example, when 2M+1 cws are used in the current block, 2M+1 curvature parameters may be default_cw, default_cw+delta_cw, default_cw−delta_cw, default_cw+2*delta_cw, default_cw−2*delta_cw, . . . , default_cw+M*delta_cw, and default_cw−M*delta_cw. (Herein, M is a positive integer more than 1).

Information on cuv and/or cw which is described above may be encoded to a bitstream or may be decoded from a bitstream. Alternatively, an encoder or a decoder may share and store information on a number of cuvs and/or cws or a value of cuv and/or cw in a format, for example, a look-up table.

When encoding/decoding at least one piece of the information on intra prediction, at least one method among binarization methods below may be used.

Binarization method using truncated rice
Binarization method using K-th order Exp_Golomb
Binarization method using constrained K-th order Exp_Golomb
Binarization method using fixed-length
Unary binarization method
Binarization method using truncated unary A decoding apparatus according to the present disclosure may receive an encoded bitstream which is encoded in step S1203, and decode information on intra prediction from the received encoded bitstream in step S1301. The decoding may include entropy decoding.

Hereinbelow, detailed descriptions about overlapped parts with step S1203 among descriptions of step 1301 are omitted. The decoding apparatus receives an encoded bitstream from the encoding apparatus and decode the received encoded bitstream. Accordingly, in addition to the descriptions about a syntax structure, a syntax element, semantics of the bitstream among descriptions of step S1203, descriptions that are not unique features of the encoder may be applied to step S1301.

Information on intra prediction may include at least one piece of information of the information which is descried with reference to FIG. 44.

The decoding apparatus may decode the information on intra prediction from the bitstream based on at least one parameter among encoding parameters.

A curved intra prediction mode may derive a pixel prediction value within a reference pixel by using a reference pixel having different angle according to a position (x, y) of a pixel within a prediction block. Pixels within the prediction block may be grouped in a plurality of groups (pixel groups). In addition, a first group among the plurality of groups may use a directional intra prediction mode having an angle different from a second group. Each group may include at least one pixel. Each group may have a shape of a triangular, a square, or other geometric shapes.

When performing intra prediction on a current block, signaling overhead for transmitting an index of the selected prediction mode may be reduced since a number of directional/non-directional modes are present. For this, an intra prediction mode of a current block may be encoded/decoded by using intra modes of adjacent units which have been already encoded/decoded.

A selected intra prediction mode for a current block of a luma component may be encoded/decoded as below.

For example, N intra prediction modes may be transmitted in an index form of an MPM (most probable modes) list having M entries. Herein, N and M may be a positive integer.

For example, N intra prediction modes may be encoded/decoded by using a fixed-length binarization.

When the intra prediction mode is encoded/decoded by using the MPM list, M entries including intra prediction modes selected by adjacent blocks which have been already encoded/decoded may be included in the MPM list.

FIG. 45 is a view exemplary showing two blocks $B_a$ and $B_b$ adjacent to a current block $B_e$ and which have been already encoded/decoded.

As shown in FIG. 45, $B_a$ and $B_b$ may be defined at position of a just left sided pixel $(x_a, y_a)$ and a just upper sided pixel $(x_b, y_b)$ based at a left upper sided pixel $(x_c, y_c)$ of a target block.

When an intra prediction mode is encoded/decoded by using an MPM, M prediction mode candidates that will be included in an MPM list may be determined according to intra prediction modes selected by adjacent blocks. A number M of prediction mode candidates that will be included in the MPM list may be fixed by the encoder/decoder, or may be variably determined by the encoder/decoder. For example, information on a number of prediction mode candidates constituting the MPM list may be signaled. The information may be signaled in at least one level of a sequence, a picture, a slice, and a block. The number of prediction mode candidates constituting the MPM list may be variably determined by considering a size/shape of a prediction block, whether or not a symmetrical/asymmetrical partition is.

In FIG. 45, candidate intra prediction mode CandIntraPredModeX, (X is A or B), may be determined by performing availability checking on $B_a$ and/or $B_b$. When $B_a$ and/or $B_b$ is not available, or is encoded/decoded based on intra prediction (inter coded), or when pcm_flag is 1, CandIntraPredModeX may be determined as a DC mode. When $B_a$ and/or $B_b$ is encoded/decoded based on intra prediction (inter coded), CandIntraPredModeX may be determined as an intra prediction mode of $B_a$ and/or $B_b$.

In addition, an MPM candidate list candModeList[x] may be filled by using initialized CandIntraPredModeX. As the prediction mode candidates constituting the MPM list, at least one of an intra prediction mode of an adjacent block, a mode derived by adding/subtracting a predetermined constant value to an intra prediction mode of an adjacent block, and a default mode may be used. The predetermined constant value may refer to 1, 2, or an integer more than 2. The default mode may refer to a Planar mode, a DC mode, an Horizontal/vertical mode, etc.

For example, when CandIntraPredModeA and CandIntraPredModeB are identical, and both are INTRA_DC modes or INTRA_PLANAR modes, the MPM candidate list may be determined as below.

{INTRA_PLANAR, INTRA_DC, vertical, horizontal, 2(diagonal from bottom left towards upper right), diagonal}

For example, when CandIntraPredModeA and CandIntraPredModeB are identical, and none of CandIntraPredModeA and CandIntraPredModeB are INTRA_DC modes nor INTRA_PLANAR modes, the MPM candidate list may be derived as below.

{CandIntraPredModeA, INTRA_PLANAR, CandIntraPredModeA+1, CandIntraPredModeA−1, CandIntraPredModeA+2, INTRA_DC}

For example, when CandIntraPredModeA and CandIntraPredModeB are not identical, the MPM candidate list may be determined as following by considering an additional condition.

When none of CandIntraPredModeA and CandIntraPredModeB are INTRA_PLANAR modes, and one of the two is an INTRA_DC mode, the MPM candidate list may be determined as below.
{CandIntraPredModeA, CandIntraPredModeB, INTRA_PLANAR, max(CandIntraPredModeA, CandIntraPredModeB)−1, max(CandIntraPredModeA, CandIntraPredModeB)+1, max(CandIntraPredModeA, CandIntraPredModeB)+2}

When none of CandIntraPredModeA and CandIntraPredModeB are INTRA_PLANAR modes nor INTRA_DC modes, the MPM candidate list may be determined as below.
{CandIntraPredModeA, CandIntraPredModeB, INTRA_PLANAR, max(CandIntraPredModeA, CandIntraPredModeB)−1, max(CandIntraPredModeA, CandIntraPredModeB)+1, max(CandIntraPredModeA, CandIntraPredModeB)+2}

When at least one of CandIntraPredModeA and CandIntraPredModeB is an INTRA_PLANAR mode, and CandIntraPredModeA+CandIntraPredModeB <2, the MPM candidate list may be determined as below.
{CandIntraPredModeA, CandIntraPredModeB, vertical or INTRA_DC, horizontal, 2, diagonal}

Otherwise, the MPM candidate list may be determined as below.
{CandIntraPredModeA, CandIntraPredModeB, vertical or INTRA_DC, max(CandIntraPredModeA, CandIntraPredModeB)−1, max(CandIntraPredModeA, CandIntraPredModeB)+1, max(CandIntraPredModeA, CandIntraPredModeB)+2}

When an intra prediction mode IntraPredModeY of a current block is included in an MPM candidate list candModeList[x], that is, prev_intra_luma_pred_flag==1, an intra prediction mode may be encoded/decoded to an index of the MPM candidate list.

When the intra prediction mode IntraPredModeY of the current block is not included in the MPM candidate list (candModeList[x]), that is, prev_intra_luma_pred_flag==0, the intra prediction mode may be encoded/decoded by using K-bit binarized rem_intra_luma_pred_mode. Herein, K may be a positive integer.

For example, in order to decode an intra prediction mode from encoded rem_intra_luma_pred_mode, prediction mode candidates included in candModeList[x] may be sorted in ascending order. When L prediction mode candidates which are equal to or less than rem_intra_luma_pred_mode by comparing therebetween are present among the sorted candModeList[x], an intra prediction mode selected by an encoding/decoding target block may be derived as IntraPredModeY=rem_intra_luma_pred_mode+L.

FIG. 46 is a view showing encoding/decoding of an intra prediction mode of a current block of a chroma component.

The intra prediction mode of the current block of the chroma component may be encoded/decoded by using intra prediction mode information intra_chroma_predmode on the chroma component and/or an intra prediction mode selected by a corresponding luma component block.

For example, an intra prediction mode IntraPredModeC of the current block of the chroma component may be encoded/decoded by using intra_chroma_pred_mode as shown in FIG. 46. IntraPredModeC may be determined according to an index of intra_chroma_pred_mode and an intra prediction mode IntraPredModeY selected by a corresponding luma component block.

The decoding/encoding of the intra prediction mode of the current block of the chroma component may be determined independent to the intra prediction mode selected by the corresponding luma component block.

For example, the intra prediction mode IntraPredModeC of the current block of the chroma component may be determined by the index of intra_chroma_pred_mode.

The intra encoding/decoding process may be performed for each of luma and chroma signals. For example, in the intra encoding/decoding process, at least one method of deriving an intra prediction mode, dividing a block, constructing reference samples and performing intra prediction may be differently applied for a luma signal and a chroma signal.

The intra encoding/decoding process may be equally performed for luma and chroma signals. For example, in the intra encoding/decoding process being applied for the luma signal, at least one of deriving an intra prediction mode, dividing a block, constructing reference samples and performing intra prediction may be equally applied to the chroma signal.

The methods may be performed in the encoder and the decoder in the same manner. For example, in the intra encoding/decoding process, at least one method of deriving an intra prediction mode, dividing a block, constructing reference samples and performing intra prediction may be applied in the encoder and the decoder equally. In addition, orders of applying the methods may be different in the encoder and the decoder. For example, in performing intra encoding/decoding for the current block, an encoder may encode an intra prediction mode determined by performing at least one intra prediction after constructing reference samples.

The embodiments of the present invention may be applied according to the size of at least one of a coding block, a prediction block, a block, and a unit. Here, the size may be defined as the minimum size and/or the maximum size in order to apply the embodiments, and may be defined as a fixed size to which the embodiment is applied. In addition, a first embodiment may be applied in a first size, and a second embodiment may be applied in a second size. That is, the embodiments may be multiply applied according to the size. In addition, the embodiments of the present invention may be applied only when the size is equal to or greater than the minimum size and is equal to or less than the maximum size. That is, the embodiments may be applied only when the block size is in a predetermined range.

For example, only when the size of the encoding/decoding target block is equal to or greater than 8×8, the embodiments may be applied. For example, only when the size of the encoding/decoding target block is equal to or greater than 16×16, the embodiments may be applied. For example, only when the size of the encoding/decoding target block is equal to or greater than 32×32, the embodiments may be applied. For example, only when the size of the encoding/decoding target block is equal to or greater than 64×64, the embodiments may be applied. For example, only when the size of the encoding/decoding target block is equal to or greater than 128×128, the embodiments may be applied. For example, only when the size of the encoding/decoding target block is 4×4, the embodiments may be applied. For example, only when the size of the encoding/decoding target block is equal to or less than 8×8, the embodiments may be applied. For example, only when the size of the encoding/decoding target block is equal to or greater than 16×16, the embodiments may be applied. For example, only when the size of the encoding/decoding target block is equal to or greater than 8×8 and is equal to or less than 16×16, the embodiments may be applied. For example, only when the size of the encoding/decoding target block is equal to or greater than 16×16 and is equal to or less than 64×64, the embodiments may be applied.

The embodiments of the present invention may be applied according to a temporal layer. An identifier for identifying the temporal layer to which the embodiment can be applied may be signaled, and the embodiments may be applied for the temporal layer specified by the identifier. Here, the identifier may be defined as indicating the minimum layer and/or the maximum layer to which the embodiment can be applied, and may be defined as indicating a particular layer to which the embodiment can be applied.

For example, only when the temporal layer of the current picture is the lowest layer, the embodiments may be applied. For example, only when a temporal layer identifier of the current picture is zero, the embodiments may be applied. For example, only when the temporal layer identifier of the current picture is equal to or greater than one, the embodiments may be applied. For example, only when the temporal layer of the current picture is the highest layer, the embodiments may be applied.

As described in the embodiment of the present invention, a reference picture set used in processes of reference picture list construction and reference picture list modification may use at least one of reference picture lists L0, L1, L2, and L3.

According to the embodiments of the present invention, when a deblocking filter calculates boundary strength, at least one to at most N motion vectors of the encoding/decoding target block may be used. Here, N indicates a positive integer equal to or greater than 1 such as 2, 3, 4, etc.

In motion vector prediction, when the motion vector has at least one of a 16-pixel (16-pel) unit, a 8-pixel (8-pel) unit, a 4-pixel (4-pel) unit, an integer-pixel (integer-pel) unit, a ½-pixel (½-pel) unit, a ¼-pixel (¼-pel) unit, a ⅛-pixel (⅛-pel) unit, a 1/16-pixel (1/16-pel) unit, a 1/32-pixel (1/32-pel) unit, and a 1/64-pixel (1/64-pel) unit, the embodiments of the present invention may be applied. In addition, in performing motion vector prediction, the motion vector may be optionally used for each pixel unit.

A slice type to which the embodiments of the present invention may be defined and the embodiments of the present invention may be applied according to the slice type.

For example, when the slice type is a T (Tri-predictive)-slice, a prediction block may be generated by using at least three motion vectors, and may be used as the final prediction block of the encoding/decoding target block by calculating a weighted sum of at least three prediction blocks. For example, when the slice type is a Q (Quad-predictive)-slice, a prediction block may be generated by using at least four motion vectors, and may be used as the final prediction block of the encoding/decoding target block by calculating a weighted sum of at least four prediction blocks.

The embodiment of the present invention may be applied to inter prediction and motion compensation methods using motion vector prediction as well as inter prediction and motion compensation methods using a skip mode, a merge mode, etc.

The shape of the block to which the embodiments of the present invention is applied may have a square shape or a non-square shape.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image decoding method performed by an image decoding apparatus, the method comprising:
   obtaining a current coding tree block by partitioning an image;
   repeatedly performing only quad tree partition on the current coding tree block until a size of coding blocks partitioned from the current coding tree block is 64×64; and
   determining a partition type of a current coding block that is one of the coding blocks among a plurality of partition types including quad tree partition, horizontal binary tree partition, and vertical binary tree partition when the size of the current coding block is equal to or less than 64×64; and
   reconstructing the current coding block based on the determined partitioned type,
   wherein,
   determining of the partition type of the current coding block comprises,
   decoding a partition flag indicating whether to partition the current coding block;
   in response to the partition flag indicating that the current coding block is partitioned, decoding a quad tree partition flag indicating whether the current coding block is quad-tree partitioned,
   in response to the quad tree partition flag indicating that the current coding block is not quad-tree partitioned, decoding a partition direction flag indicating a partition direction of the current coding block, and
   determining the partition type of the current coding block based on the partition flag, the quad tree partition flag, and the partition direction flag.

2. The image decoding method of claim 1,
   wherein the reconstructing of the current coding block comprises performing intra prediction for the current coding block, and
   the intra prediction is performed by using a reference sample line selected from a plurality of reference sample lines.

3. The image decoding method of claim 2,
   wherein information for selecting the reference sample line from the plurality of reference sample lines is reconstructed from a bitstream.

4. An image encoding method performed by an image encoding apparatus, the method comprising:
   obtaining a current coding tree block by partitioning an image;
   repeatedly performing only quad tree partition on the current coding tree block until a size of coding blocks partitioned from the current coding tree block is 64×64; and
   determining a partition type of a current coding block that is one of the coding blocks among a plurality of partition types including quad tree partition, horizontal binary tree partition, and vertical binary tree partition when the size of the current coding block is equal to or less than 64×64; and
   encoding the current coding block based on the determined partitioned type,
   wherein,
   determining of the partition type of the current coding block comprises,
   encoding a partition flag indicating whether to partition the current coding block based on the partition type of the current coding block;
   in response to the partition flag indicating that the current coding block is partitioned, encoding a quad tree partition flag indicating whether the current coding block is quad-tree partitioned based on the partition type of the current coding block, and
   in response to the quad tree partition flag indicating that the current coding block is not quad-tree partitioned, encoding a partition direction flag indicating a partition direction of the current coding block based on the partition type of the current coding block.

5. The image encoding method of claim 4,
   wherein the encoding of the current coding block comprises performing intra prediction for the coding block, and
   the intra prediction is performed by using a reference sample line selected from a plurality of reference sample lines.

6. The image encoding method of claim 5,
   wherein information for selecting the reference sample line from the plurality of reference sample lines is encoded into a bitstream.

7. A non-transitory computer-readable recording medium storing a bitstream which is generated by an image encoding method,
   the method comprising:
   obtaining a current coding tree block by partitioning an image;
   repeatedly performing only quad tree partition on the current coding tree block until a size of coding blocks partitioned from the current coding tree block is 64×64, and determining a partition type of a current coding block that is one of the coding blocks among a plurality of partition types including quad tree partition, horizontal binary tree partition and vertical binary tree partition when the size of the current coding block is equal to or less than 64×64; and encoding the current coding block based on the determined partitioned type, wherein, determining of the partition type of the current coding block comprises, encoding a partition flag indicating whether to partition the current coding block based on the partition type of the current coding block;

in response to the partition flag indicating that the current coding block is partitioned, encoding a quad tree partition flag indicating whether the current coding block is quad-tree partitioned based on the partition type of the current coding block, and in response to the quad tree partition flag indicating that the current coding block is not quad-tree partitioned, encoding a partition direction flag indicating a partition direction of the current coding block based on the partition type of the current coding block.

* * * * *